(12) United States Patent
Fang et al.

(10) Patent No.: US 9,981,323 B2
(45) Date of Patent: May 29, 2018

(54) DOUBLE-SIDED TANGENTIAL CUTTING INSERT AND CUTTING TOOL SYSTEM USING THE SAME

(71) Applicants: Xiangdong Daniel Fang, Brentwood, TN (US); Jean-Luc Dufour, Franklin, TN (US); Lance Brunetto, Greensburg, PA (US); Kent Mizgalski, Stahlstown, PA (US); David Wills, Greensburg, PA (US); David Cope, Mayfield Heights, OH (US)

(72) Inventors: Xiangdong Daniel Fang, Brentwood, TN (US); Jean-Luc Dufour, Franklin, TN (US); Lance Brunetto, Greensburg, PA (US); Kent Mizgalski, Stahlstown, PA (US); David Wills, Greensburg, PA (US); David Cope, Mayfield Heights, OH (US)

(73) Assignee: KENNAMETAL INC., Latrobe, PA (US)

( * ) Notice: Subject to any disclaimer, the term of this patent is extended or adjusted under 35 U.S.C. 154(b) by 326 days.

(21) Appl. No.: 14/801,181

(22) Filed: Jul. 16, 2015

(65) Prior Publication Data

US 2017/0014920 A1 Jan. 19, 2017

(51) Int. Cl.
*B23C 5/20* (2006.01)
*B23C 5/22* (2006.01)
*B23C 5/08* (2006.01)

(52) U.S. Cl.
CPC ............. *B23C 5/2221* (2013.01); *B23C 5/08* (2013.01); *B23C 2200/0433* (2013.01);
(Continued)

(58) Field of Classification Search
CPC ........ B23C 2200/203; B23C 2200/208; B23C 2200/367; B23C 5/2221; B23C 5/08; B23C 2200/0433; B23C 2200/36
See application file for complete search history.

(56) References Cited

U.S. PATENT DOCUMENTS 4,632,607 A 12/1986 Pantzar
D341,604 S 11/1993 Hessman
(Continued)

FOREIGN PATENT DOCUMENTS

CN 1913998 A 2/2007
CN 201931144 U 8/2011
(Continued)

OTHER PUBLICATIONS

Jul. 7, 2016—*Ex Parte Quayle* Office Action.
Jan. 1, 2018, Notice of Allowance K-06029-US-CIP.

*Primary Examiner* — Sara Addisu
(74) *Attorney, Agent, or Firm* — Matthew S. Bedsole

(57) ABSTRACT

A double-sided tangential cutting insert, as well as a tool holder system that carries a plurality of the double-sided tangential cutting inserts, that has a peripheral side shape, as viewed from one of said cutting rake faces, that includes a pair of generally identical opposing main cutting edges wherein each of the main cutting edge comprises a substantially straight main cutting edge portion and an adjoining convex main cutting edge portion. The convex main cutting edge portion is truncated by an adjacent convex minor side face so as to define a generally sharp edge and a point of truncation. The peripheral side shape further includes a pair of opposing full nose cutting edges with a nose cutting radius; and a pair of opposing convex minor cutting edges with a minor cutting edge radius. The minor cutting edge radius is at least about four times greater than the nose cutting radius.

21 Claims, 18 Drawing Sheets

(52) U.S. Cl.
CPC .. *B23C 2200/203* (2013.01); *B23C 2200/208* (2013.01); *B23C 2200/367* (2013.01); *B23C 2220/36* (2013.01)

(56) References Cited

U.S. PATENT DOCUMENTS

| | | | |
|---|---|---|---|
| D347,642 S | 6/1994 | Lindberg | |
| D364,178 S | 11/1995 | Hansson | |
| D379,360 S | 5/1997 | Satran | |
| D404,406 S | 1/1999 | Satran | |
| 5,863,156 A | 1/1999 | Satran et al. | |
| 6,074,137 A | 6/2000 | Betman et al. | |
| 6,146,063 A | 11/2000 | Ramold et al. | |
| 6,196,770 B1 * | 3/2001 | Astrom | B23C 5/109 407/114 |
| 6,227,772 B1 | 5/2001 | Heinloth et al. | |
| 6,238,146 B1 | 5/2001 | Satran et al. | |
| 6,536,996 B2 | 3/2003 | Satran et al. | |
| D485,852 S | 1/2004 | Arvidsson | |
| 6,682,274 B2 | 1/2004 | Votsch et al. | |
| D486,505 S | 2/2004 | Arvidsson | |
| D487,281 S | 3/2004 | Roman et al. | |
| 6,805,520 B2 | 10/2004 | Gesell et al. | |
| 6,872,034 B2 | 3/2005 | Satran et al. | |
| 6,929,429 B2 | 8/2005 | Riviere | |
| 6,966,729 B2 | 11/2005 | Dehn et al. | |
| 6,974,280 B2 | 12/2005 | Satran et al. | |
| 7,008,146 B2 | 3/2006 | DeRoche et al. | |
| 7,063,489 B2 | 6/2006 | Satran | |
| 7,073,987 B2 | 7/2006 | Hecht | |
| 7,094,007 B2 | 8/2006 | Satran et al. | |
| 7,097,393 B2 | 8/2006 | Satran et al. | |
| 7,104,735 B2 | 9/2006 | Johnson et al. | |
| 7,241,082 B2 | 7/2007 | Smilovici et al. | |
| 7,494,303 B2 | 2/2009 | Koshinen | |
| 7,549,825 B2 | 6/2009 | Wermeister | |
| 7,758,287 B2 | 7/2010 | Aim et al. | |
| 7,775,750 B2 | 8/2010 | Satran et al. | |
| 7,857,555 B2 | 12/2010 | Wermeister | |
| 7,905,687 B2 * | 3/2011 | Dufour | B23C 5/06 407/113 |
| 7,905,688 B2 * | 3/2011 | Ertl | B23C 5/10 407/113 |
| 7,909,544 B2 | 3/2011 | Jansson | |
| 7,922,427 B2 | 4/2011 | Spitzenberger et al. | |
| D637,214 S | 5/2011 | Saito et al. | |
| D638,041 S | 5/2011 | Saito et al. | |
| 7,976,250 B2 | 7/2011 | Fang et al. | |
| 8,100,610 B2 | 1/2012 | Kirchberger | |
| 8,172,487 B2 | 5/2012 | Ballas | |
| 8,202,026 B2 | 6/2012 | Satran et al. | |
| 8,277,153 B2 | 10/2012 | Kovac et al. | |
| 8,282,320 B2 | 10/2012 | Hartlohner et al. | |
| 8,366,359 B2 | 2/2013 | Heinloth et al. | |
| 8,388,275 B2 | 3/2013 | Hecht | |
| 8,430,606 B2 | 4/2013 | Zettler | |
| 8,434,974 B2 | 5/2013 | Spitzenberger | |
| 8,449,230 B2 | 5/2013 | Nguyen et al. | |
| 8,454,278 B2 | 6/2013 | Hartlohner et al. | |
| 8,491,234 B2 | 7/2013 | Fang et al. | |
| D688,716 S | 8/2013 | Lampe | |
| 8,511,942 B2 | 8/2013 | Kretzschmann et al. | |
| 8,529,167 B2 | 9/2013 | Shaheen | |
| 8,550,754 B2 | 10/2013 | Hecht | |
| 8,556,546 B2 | 10/2013 | Smilovici et al. | |
| 8,568,065 B2 | 10/2013 | Neiman et al. | |
| 8,573,905 B2 | 11/2013 | Hecht | |
| 8,641,331 B2 | 2/2014 | Zastrozynski et al. | |
| 8,678,718 B2 | 3/2014 | Hecht | |
| 8,696,255 B2 | 4/2014 | Hecht | |
| 8,702,353 B2 | 4/2014 | Chen et al. | |
| 8,753,045 B2 | 6/2014 | Hecht | |
| 8,814,479 B2 | 8/2014 | Kaufmann | |
| 8,834,076 B2 | 9/2014 | Gesell et al. | |
| 8,876,440 B2 | 11/2014 | Nam et al. | |
| 8,882,405 B2 | 11/2014 | Oprasic et al. | |
| 8,931,979 B2 | 1/2015 | Choi et al. | |
| 8,961,076 B2 * | 2/2015 | Ishi | B23C 5/06 407/113 |
| 8,967,920 B2 | 3/2015 | Krishtul | |
| 8,979,440 B2 | 3/2015 | Ishi | |
| 9,044,813 B2 | 6/2015 | Choi et al. | |
| D736,841 S | 8/2015 | Jung | |
| D744,557 S | 12/2015 | Koike | |
| D748,703 S | 2/2016 | Nam et al. | |
| D750,941 S | 3/2016 | Thiemer | |
| D752,664 S | 3/2016 | Jung | |
| D755,267 S | 5/2016 | Lee | |
| D777,230 S | 1/2017 | Fang | |
| D778,330 S * | 2/2017 | Fang et al. | D15/139 |
| 2003/0170080 A1 | 9/2003 | Hecht | |
| 2004/0208713 A1 | 10/2004 | Duerr | |
| 2005/0042044 A1 | 2/2005 | Satran | |
| 2005/0063792 A1 | 3/2005 | Satran | |
| 2007/0059111 A1 * | 3/2007 | Deitert | B23C 5/207 407/113 |
| 2009/0285646 A1 | 11/2009 | Oprasic et al. | |
| 2009/0311057 A1 * | 12/2009 | Yoshida | B23C 5/109 407/113 |
| 2010/0202839 A1 * | 8/2010 | Fang | B23C 5/109 407/53 |
| 2012/0070242 A1 * | 3/2012 | Choi | B23C 5/109 407/113 |
| 2012/0093596 A1 * | 4/2012 | Ishi | B23C 5/06 407/113 |
| 2013/0115022 A1 | 5/2013 | Ishi | |
| 2013/0121775 A1 | 5/2013 | Dudzinsky et al. | |
| 2013/0183108 A1 | 7/2013 | Zettler | |
| 2013/0195566 A1 | 8/2013 | Bhagath | |
| 2013/0322974 A1 | 12/2013 | Scherbarth | |
| 2014/0064864 A1 | 3/2014 | Kaufmann et al. | |
| 2014/0212229 A1 | 7/2014 | Diepold | |
| 2014/0298967 A1 | 10/2014 | Ishi | |
| 2014/0341660 A1 | 11/2014 | Cheon | |
| 2014/0348599 A1 | 11/2014 | Kovac et al. | |
| 2014/0369773 A1 | 12/2014 | Waggle et al. | |
| 2015/0071717 A1 | 3/2015 | Morrison et al. | |
| 2015/0117968 A1 * | 4/2015 | Brunetto | B23C 5/207 407/42 |
| 2015/0117969 A1 * | 4/2015 | Brunetto | B23C 5/207 407/42 |
| 2015/0117970 A1 | 4/2015 | Daub | |
| 2015/0139744 A1 * | 5/2015 | Harif | B23B 51/02 407/69 |
| 2017/0157685 A1 * | 6/2017 | Mao | B23C 5/2213 |
| 2017/0297120 A1 * | 10/2017 | Fang | B23C 5/2247 |

FOREIGN PATENT DOCUMENTS

| | | |
|---|---|---|
| CN | 103658797 A | 3/2014 |
| CN | 104174918 A | 12/2014 |
| DE | 102007011395 A1 | 9/2008 |
| EP | 0958085 B1 | 4/2001 |
| EP | 1097017 B1 | 9/2002 |
| EP | 2805787 A1 | 8/2005 |
| EP | 1480774 B1 | 6/2006 |
| EP | 1572407 B1 | 1/2007 |
| EP | 1610920 B1 | 2/2007 |
| EP | 2332681 A2 | 2/2007 |
| EP | 1238734 B1 | 6/2007 |
| EP | 1677934 B1 | 4/2008 |
| EP | 2214857 B1 | 11/2008 |
| EP | 1509354 B1 | 11/2009 |
| EP | 2119520 A1 | 11/2009 |
| EP | 1565285 B1 | 8/2010 |
| EP | 1991382 B1 | 3/2011 |
| EP | 2144724 B1 | 5/2011 |
| EP | 2368658 A1 | 9/2011 |
| EP | 1846182 B1 | 8/2012 |
| EP | 2229255 B1 | 3/2013 |
| EP | 1711296 B1 | 5/2013 |
| EP | 2755365 A2 | 1/2014 |
| EP | 2523773 B1 | 6/2014 |

(56) References Cited

FOREIGN PATENT DOCUMENTS

| | | | | |
|---|---|---|---|---|
| EP | 2198997 | B1 | 4/2015 | |
| IL | 160223 | A1 | 2/2004 | |
| IL | 187721 | B | 11/2007 | |
| IL | 198726 | A1 | 5/2009 | |
| IL | 200063 | B | 7/2009 | |
| JP | 2006082168 | A * | 3/2006 | |
| JP | 2007520360 | T2 | 7/2007 | |
| JP | 2013121636 | A * | 6/2013 | |
| JP | 2014000666 | | 1/2014 | |
| JP | 2016172294 | A * | 9/2016 | ............... B23C 5/20 |
| KR | 100756291 | B | 9/2007 | |
| KR | 20090102423 | A | 9/2009 | |
| KR | 20130029199 | A | 3/2013 | |
| KR | 101308186 | B | 9/2013 | |
| RU | 108330 | U | 9/2011 | |
| RU | 133033 | U | 10/2013 | |
| WO | 2010126693 | | 11/2010 | |
| WO | 2013023801 | | 2/2013 | |
| WO | 2014006609 | | 1/2014 | |
| WO | 14033549 | A2 | 3/2014 | |
| WO | 2014044419 | | 3/2014 | |
| WO | 2014161658 | | 10/2014 | |
| WO | 2015030421 | | 3/2015 | |
| WO | WO 2016147493 | A1 * | 9/2016 | ............... B23C 5/20 |

\* cited by examiner

DETAIL J

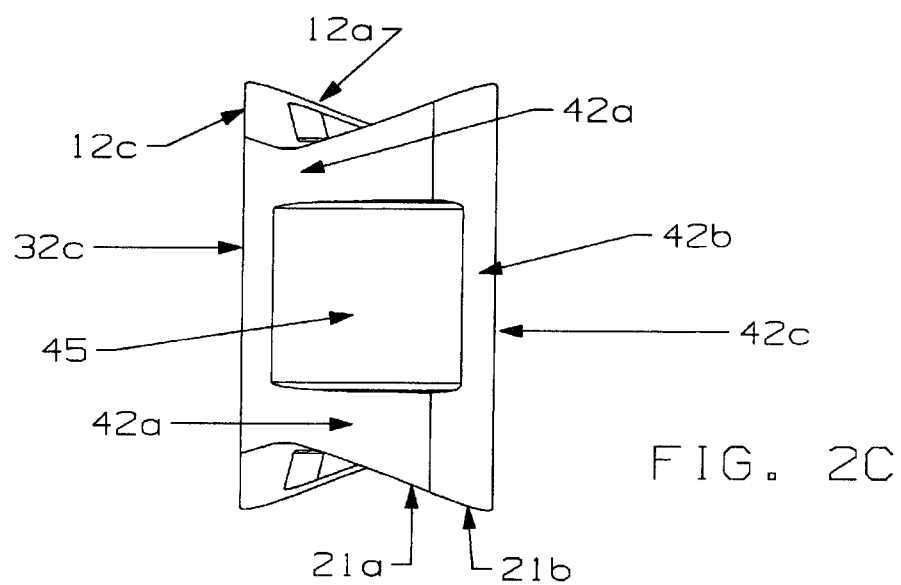

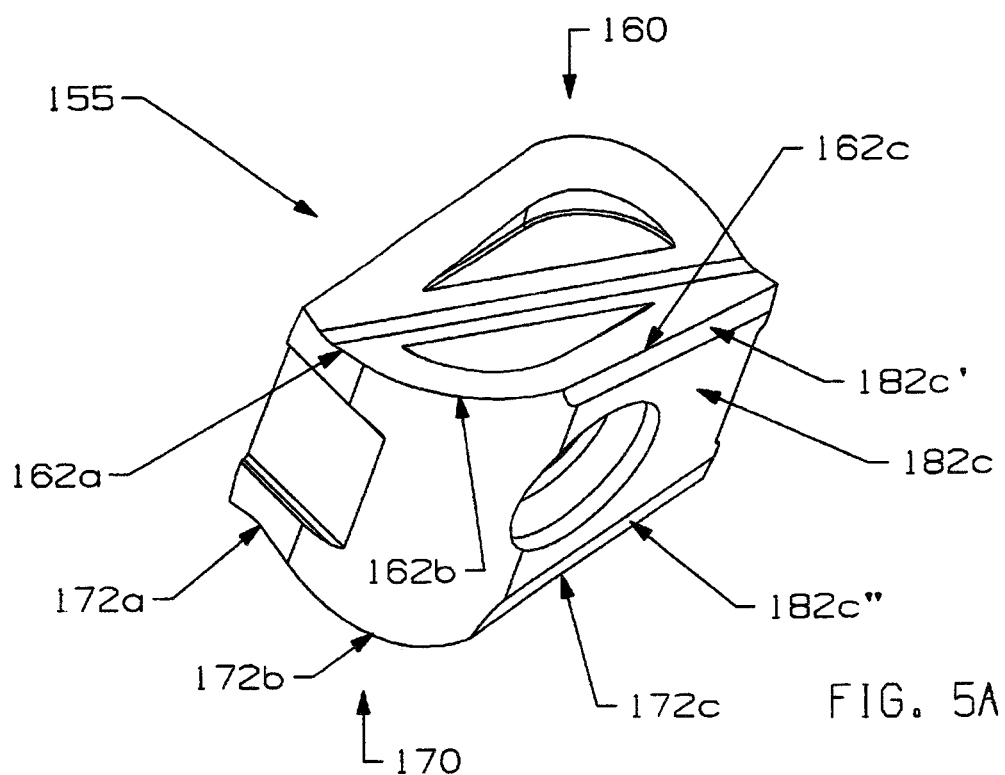

DETAIL L

DOUBLE-SIDED TANGENTIAL CUTTING INSERT AND CUTTING TOOL SYSTEM USING THE SAME

BACKGROUND OF THE INVENTION

The present disclosure is directed to an indexable double-sided tangential cutting insert and a cutting tool system, which use such double-sided tangential cutting inserts, for a variety of rotary milling applications. In one non-limiting specific embodiment, indexable double-sided tangential cutting inserts according to the present invention are particularly useful in peripheral rotary milling applications for machining difficult-to-machine materials. In another non-limiting specific embodiment, indexable double-sided tangential cutting inserts according to the present invention are uniquely useful in peripheral rotary milling applications that generate segmented chips, for instance, when machining cast-iron and alloys or medium to high carbon steels.

A double-sided tangential milling cutting insert is generally defined as the cutting rake faces where the chip groove/chip breaker does not have a through fastener hole, or in other words, the through fastener hole is located between two cutting rake faces, but in a laterally-crossed orientation. For a double-sided tangential cutting insert, all cutting rake faces with built-in chip groove geometry must have an abutment face to support the tangential cutting force during the machining.

Efforts in the industry to develop new or improved double-sided tangential cutting inserts have been directed toward achieving reduced cutting forces, reduced power consumption, increased cutting edge strength, and increased tool life. Representative patent documents include U.S. Pat. No. 6,872,034, U.S. Pat. No. 7,063,489, U.S. Pat. No. 7,094,007, and U.S. Pat. No. 7,104,735 wherein these documents have disclosed double-sided tangential cutting inserts with two basic shapes in major side surfaces (trapezoidal and parallelogram) and varying abutment surfaces on the cutting rake surface. From the point view of geometrical design, the above-mentioned patents disclose a generally rectangular shape peripherally enclosed by the two planar major side faces, two planar minor side faces and together with four nose faces as viewed normally to the cutting rake surface of the double-sided tangential cutting insert, or in other words, the main cutting edge is perpendicular to the minor cutting edge. The drawbacks with the kinds of cutting inserts disclosed in these patents include a difficulty to effectively balance on the required surface finish and the perpendicularity between the machined surface and machined wall on the workpiece which occurs, for example, in a slot milling, largely due to the complex cutting edge geometry in particular on the minor cutting edges formed between the cutting rake face and the minor side face.

The present invention aims at developing an improved double-sided tangential cutting insert, as well as a cutting tool system using the improved double-sided tangential cutting insert, to address the above-mentioned issues.

SUMMARY OF THE INVENTION

The present invention provides an innovative and unique concept for indexable double-sided tangential cutting inserts. The double-sided tangential cutting insert of the present invention has a unique peripheral shape mainly enclosed by the two planar major side faces and two convex minor side faces as viewed normally from flat abutment faces on a cutting rake surface. The double-sided tangential cutting insert of the present invention has two major cutting edges formed between a cutting rake surface and two planar major side faces. The double-sided tangential cutting insert further has two convex minor cutting edges each having a large convex radius formed between a cutting rake surface and two convex minor side faces each having generally arcuate or conical surface.

The two identical opposing cutting rake surfaces of the double-sided tangential cutting insert of the present invention have a unique peripheral profile comprising mainly a pair of identical opposing substantially straight cutting edges, a pair of opposing arcuate cutting edges with a regular radius and a pair of opposing convex minor cutting edges with a much larger radius (as viewed from a direction normal to the cutting rake surface). One advantage of a convex minor cutting edge with a much larger radius associated with a convex minor side face is to guarantee the surface finish of machined surface as well as the perpendicularity between the machined surface and machined wall on the workpiece under some heavy cutting conditions. Another advantage of a convex minor cutting edge having a large radius is that the large curvature radius, as compared with a straight minor cutting edge perpendicular to a straight main cutting edge, can adapt to some undesirable machining processes such as, for example, tool holder deflections during machining and tolerance variations from product manufacturing.

According to one non-limiting aspect of the present invention, each indexable cutting edge of the double-sided tangential cutting insert, as viewed from the normal direction of the flat abutment faces on a cutting rake surface, comprises at least a convex minor cutting edge having a large radius, a single full nose cutting edge and a main cutting edge truncated by the adjacent convex minor side face.

According to another non-limiting aspect of the present invention, each indexable cutting edge of the double-sided tangential cutting insert comprises, as viewed from the normal direction of the flat abutment faces on a cutting rake surface, a convex minor cutting edge having a large radius, a single full nose cutting edge, a main cutting edge, and a partial nose cutting edge having a small and fixed radius no larger than about 0.25 mm and truncated by the adjacent convex minor side face.

Further according to another non-limiting aspect of the present invention, each indexable cutting edge of the double-sided tangential cutting insert, as viewed from the normal direction of the flat abutment faces on a cutting rake surface, comprises a convex minor cutting edge having a large radius, a single full nose cutting edge, a main cutting edge comprising a straight main cutting edge portion and a convex main cutting edge portion truncated by the adjacent convex minor side face.

Further, according to still another non-limiting aspect of the present invention, a cutting tool system comprising a tool holder; at least one insert-receiving pocket on the tool holder; and at least one double-sided tangential cutting insert according to present invention wherein the insert-receiving pocket is built-in around the periphery of the tool holder and comprises a bottom seating face with a threaded hole, an axial seating face, and a peripheral seating face abutting a pair of flat abutment faces on the cutting rake surface of a double-sided tangential cutting insert.

BRIEF DESCRIPTION OF THE DRAWINGS

Various features and characteristics of non-limiting specific embodiments according to the present invention will be better understood by reference to the following drawings, in which:

FIG. 2C is a projected view on the minor side surface on the right side of the double-sided tangential cutting insert of FIG. 1;

FIG. 4A is an enlarged view identified as DETAIL D that corresponds to the structure in the circle identified as D in FIG. 4;

FIG. 5A is a three-dimensional perspective view of an additional specific embodiment of a trapezoidal double-sided tangential cutting insert;

DETAILED DESCRIPTION OF THE INVENTION

In the present description of non-limiting specific embodiments and in the claims, other than in the operating examples or where otherwise indicated, all numbers expressing quantities or characteristics of ingredients and products, processing conditions, and the like are to be understood as being modified in all instances by the term "about". Accordingly, unless indicated to the contrary, any numerical parameters set forth in the following description and the attached claims are approximations that may vary depending upon the desired properties one seeks to obtain in the apparatus and methods according to the present disclosure. At the very least, and not as an attempt to limit the application of the doctrine of equivalents to the scope of the claims, each numerical parameter should at least be construed in light of the number of reported significant digits and by applying ordinary rounding techniques.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

Double-sided tangential cutting inserts are typically used in peripheral rotary milling and slot milling due to their relatively larger depth of cut obtained by the relatively longer cutting edge.

Figure 1:
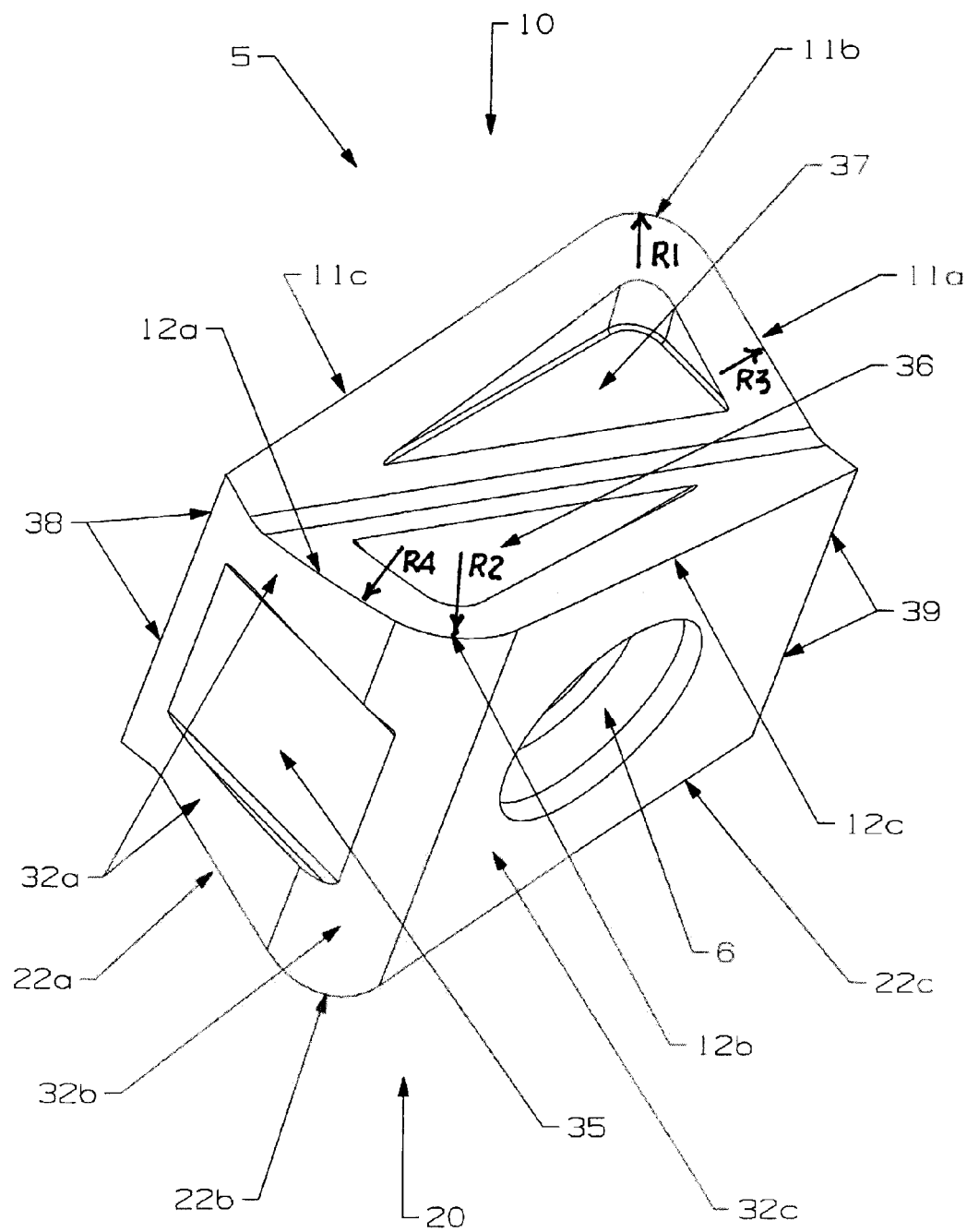
FIG. 1 is a specific embodiment of a trapezoidal double-sided tangential cutting insert with each indexable cutting edge comprising a convex minor cutting edge having a large radius, a single full nose cutting edge, a main cutting edge truncated by the adjacent convex minor side face according to present invention.
Figure 2A:
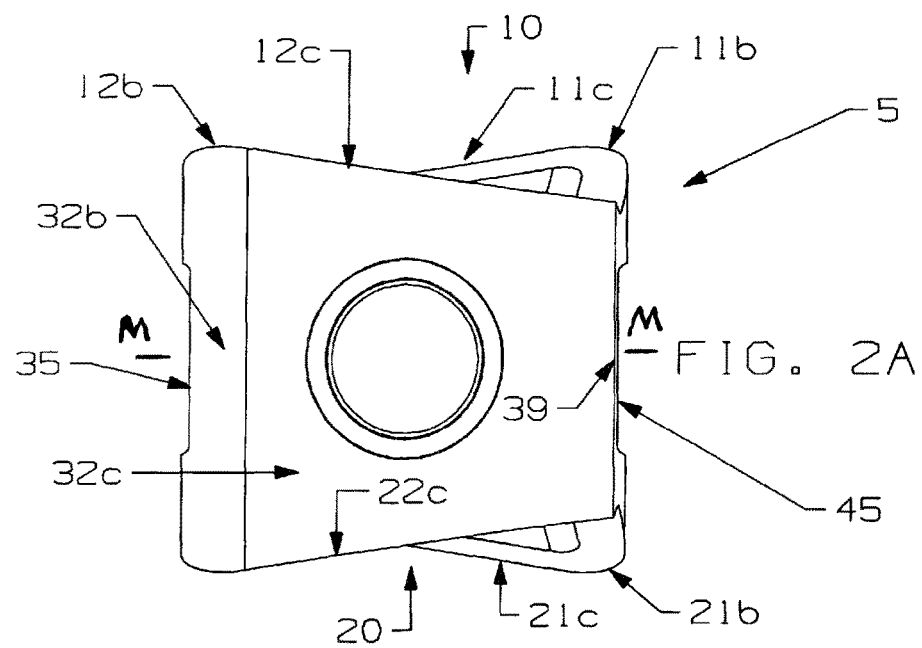
FIG. 2A is a projected view on the major side surface of the double-sided tangential cutting insert of FIG. 1.
Figure 2B:
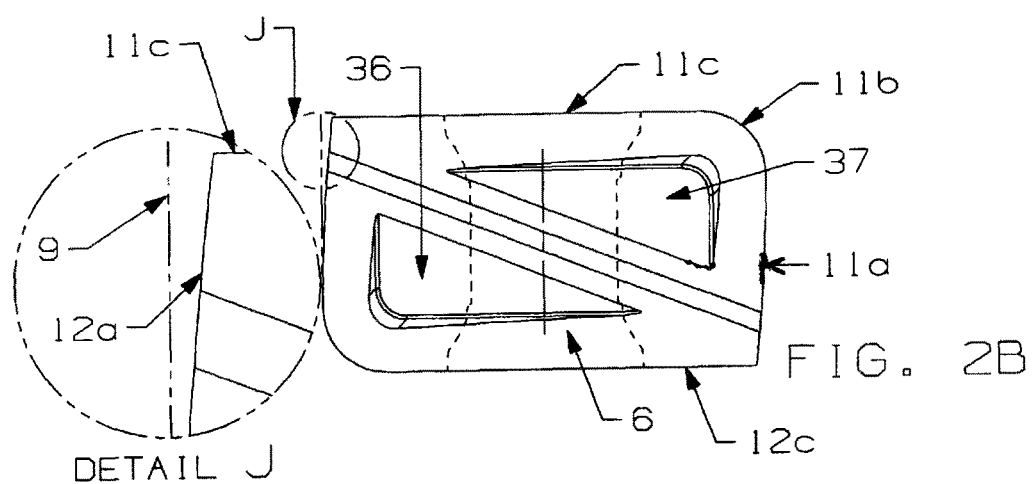
FIG. 2B is a projected view on the cutting rake surface of the double-sided tangential cutting insert of FIG. 1 and includes DETAIL J.

FIG. 1 and FIGS. 2A-2C show an embodiment of a trapezoidal double-sided tangential cutting insert 5 wherein FIG. 1 is a three-dimensional perspective view, FIG. 2A is a projected view on the major (planar) side surface 32c having a trapezoidal shape, FIG. 2B is a projected view on the cutting rake surface 10 together with a detailed view J, and FIG. 2C is a projected view as viewed from the right side of FIG. 2A.

The double-sided tangential cutting insert 5 with a through fastener hole 6 has a top cutting rake surface 10 and an identical (or substantially identical) bottom cutting rake surface 20 (partially visible) wherein the bottom cutting rake surface 20 has a mirror relationship with the top cutting rake surface 10 via a median plane m-m through the center of the hole 6. The top cutting rake surface 10 has a peripheral shape comprising a pair of identical opposing substantially straight cutting edges 11c and 12c, a pair of opposing nose cutting edges 11b and 12b having a radius of R1 and R2, respectively, typically ranging in size from about 0.4 mm to about 8.0 mm, and a pair of opposing convex minor cutting edges 11a and 12a having a radius of R3 and R4, respectively. For each of the convex minor cutting edges (11a, 12a) the radius R3 and R4 are at least four times larger than the range of the corresponding radius (R1 and R2) of the nose cutting edges 11b and 12b. In other words, the minor cutting edge radius R3 is at least about four times as great as the nose cutting radius R1, and R4 is at least about four times as great as R2.

A representative indexable cutting edge on the top cutting rake surface 10 comprises a convex minor cutting edge 11a having a large radius R3, a single full nose cutting edge 11b, a main cutting edge 11c truncated by the adjacent convex minor side face 32a. A full nose cutting edge 11b is defined as the nose cutting edge being tangent to both adjacent cutting edges (11a and 11c). A sharp edge 38 is formed as a result that the main cutting edge 11c is truncated by the adjacent convex minor side face 32a.

Similarly, another indexable cutting edge on the top cutting rake surface 10 comprises a convex minor cutting edge 12a having a large radius (R4), a single and full nose cutting edge 12b, and a major cutting edge 12c truncated by the adjacent convex minor side face 42a (see FIG. 2C). The Detail View J in FIG. 2B illustrates that the convex minor cutting edge 12a turns away in the form (or path) of an arc from the virtual reference line 9 which is perpendicular to both the main cutting edges 11c and 12c. One advantage of the convex minor cutting edge 12a is to guarantee (or improve the production of an acceptable) surface finish of the machined surface when operating under undesirable machining conditions such as, for example, tool holder deflections during machining and tolerance variations from product manufacturing. A sharp edge 39 is also formed as a result that the main cutting edge 12c (or equivalently the major side face 32c) is truncated by the adjacent convex minor side face 42a. On the bottom cutting rake face 20 of the cutting insert 5 there are two indexable cutting edges 22a, 22b and 22c (FIG. 1), and 21a, 21b and 21c (FIG. 2A and FIG. 2C), respectively.

In reality of cutting insert manufacturing like in a carbide pressing process, the sharp edges 38 and 39 may be blended with a small radius (typically about 0.25 mm or smaller) which is much smaller than a regular nose radius (R1 and R2) (ranging from about 0.4 to about 8 mm). Thus, the sharp edges (38, 39) may, in actuality, be generally sharp edges due to the above small radius wherein the generally sharp edges are at the abrupt termination of the adjacent surfaces (or faces). This description of the sharp edges applies to the other references to sharp edges in this application.

Further, as illustrated in FIG. 2C, the peripheral side surface of the cutting insert 5 extending from the top cutting rake surface 10 to the bottom cutting rake surface 20 comprises a pair of identical (or substantially identical) opposing planar major side faces 32c and 42c functioning as seating faces, a pair of opposing identical (or substantially identical) arcuate side faces 32b and 42b, and a pair of opposing identical (or substantially identical) convex minor side faces 32a and 42a. The cutting insert 5 has a pair of identical (or substantially identical) distinct peripheral support surfaces 36 and 37, which have a generally triangular shape when viewed in a direction perpendicular to the cutting rake surface, on a top cutting rake face 10 wherein the surfaces 36 and 37 are generally co-planar and generally perpendicular to a major side face 32c or 42c. The stability of the support is thought to be enhanced (or increased) due to the fact that the peripheral support surfaces are spaced-apart (or separated or distinct) from each other. The double-sided tangential cutting insert 5 also has two identical axial support faces 35 (FIG. 1) and 45 (FIG. 2C) wherein the convex minor side face 32a is partially truncated by the face 35, and the convex minor side face 42a is partially truncated by the face 45. The cutting insert 5 is referred as a trapezoidal double-sided tangential cutting insert as the main cutting edge 12c at the top face 10 is not parallel to the main cutting edge 22c at the bottom face 20 as shown in FIG. 2A.

Figure 3:
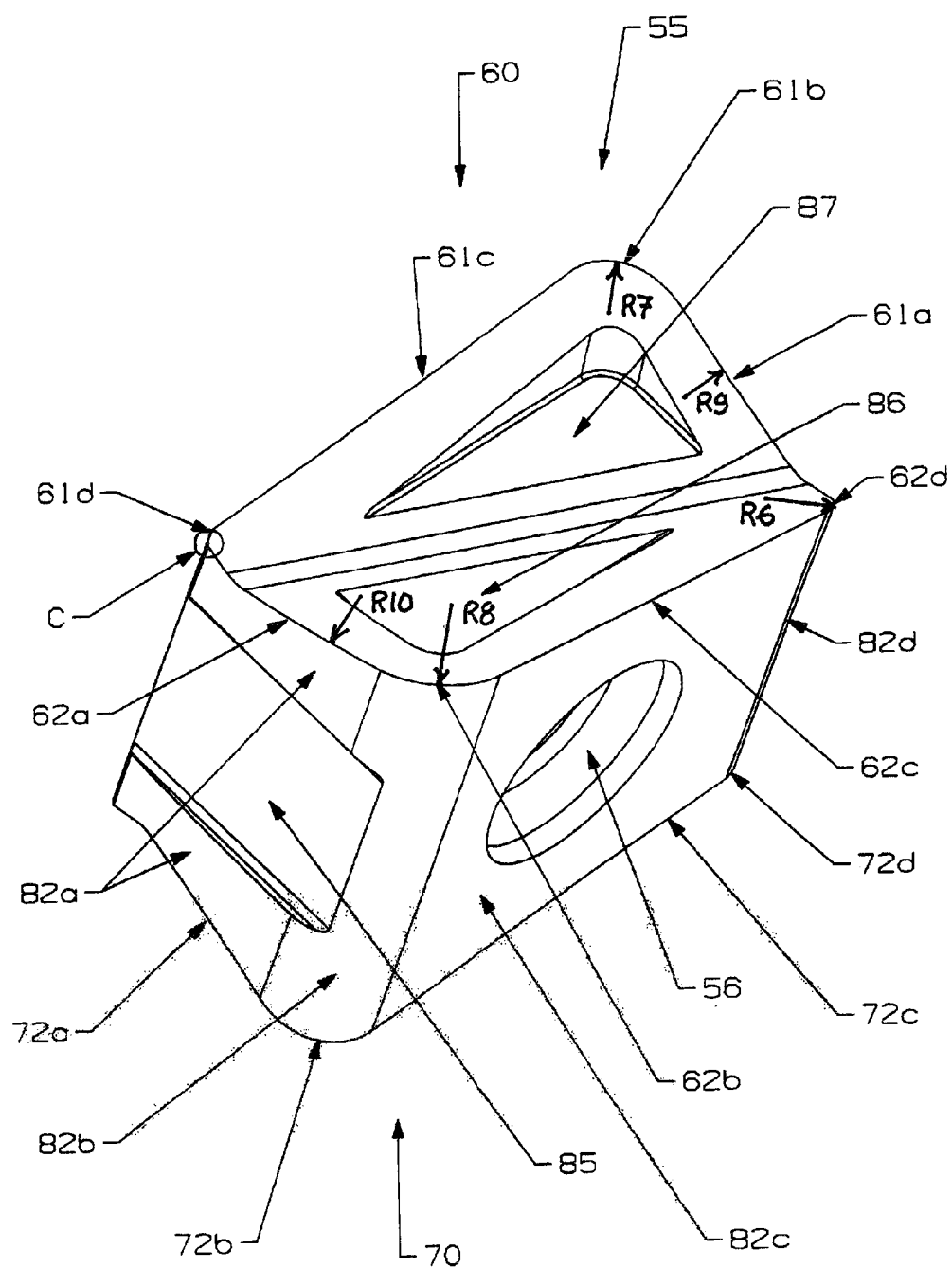
FIG. 3 is a three-dimensional perspective view another specific embodiment of a trapezoidal double-sided tangential cutting insert with each indexable cutting edge comprising a convex minor cutting edge having a large radius, a single full nose cutting edge, a main cutting edge, and a partial nose cutting edge having a smaller and fixed radius (generally, but not limited to be equal to no larger than about 0.25 mm) and being truncated by the adjacent convex minor side face according to present invention.
Figure 3A:
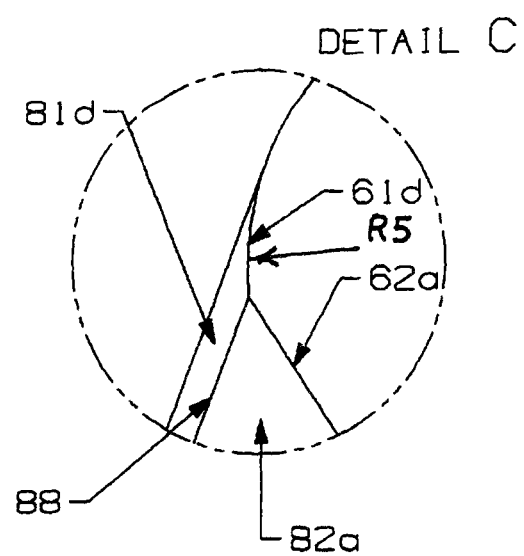
FIG. 3A is an enlarged view identified as DETAIL C that corresponds to the structure in the circle designated as C in FIG. 3.

FIG. 3 is a perspective three-dimensional view together with a detail view C (see FIG. 3A) of another specific embodiment of a trapezoidal double-sided tangential cutting insert 55 according to present invention. FIG. 3A is a detail view DETAIL C that shows the structure in circle identified as C in FIG. 3.

The double-sided tangential cutting insert 55 with a through fastener hole 56 has a top cutting rake surface 60 and an identical (or substantially identical) bottom cutting rake surface 70. The top cutting rake surface 60 has a peripheral cutting edge comprising mainly a pair of identical (or substantially identical) opposing partial nose cutting edge 61d (radius R5) and 62d (radius R6) having a small and fixed radius (typically no larger than about 0.25 mm), a pair of identical (or substantially identical) opposing substantially straight cutting edges 61c and 62c, a pair of opposing full nose cutting edges 61b and 62b having a radius of R7 and R8, respectively, typically ranging from about 0.4 mm to about 8.0 mm, and a pair of opposing convex minor cutting edges 61a and 62a having a radius of R9 and R10, respectively. For each of the convex minor cutting edges (61a, 62a), the radius R9 and R10 are at least four (4) times greater than the range of the corresponding full nose cutting edges 61b and 62b. In other words, R9 is at least about four times as great as R7, and R10 is at least about four times as great as R8. As is apparent, the radii R5 and R6 of the partial nose cutting edges (61d, 62d) are smaller than the radii R7 or R8 of the full nose cutting edges (61b, 62b) and the radii R5 and R6 of the partial nose cutting edges (61d, 62d) are smaller than the radii R9 and R10 of the convex minor cutting edges (61a, 62a).

A representative indexable cutting edge on the top cutting rake surface 60 comprises a convex minor cutting edge 61a having a very large radius (R9), a single full nose cutting edge 61b (radius R5), a straight main cutting edge 61c, and a partial nose cutting edge 61d (radius R5) truncated by the adjacent convex minor side face 82a. A sharp edge 88 is formed as a result that the partial nose cutting edge 61d is truncated by the adjacent convex minor side face 82a. A representative indexable cutting edge on the bottom cutting rake surface 70 comprises a convex minor cutting edge 72a having a large radius, a full nose cutting edge 72b, a main cutting edge 72c, and a partial and truncated nose cutting edge 72d. The radius of each of the convex minor cutting edge 72A, the full nose cutting edge 72b, and the partial and truncated nose cutting edge 72d is along the lines of the corresponding radius of each of the convex minor cutting edge 62A, the full nose cutting edge 62b, and the partial and truncated nose cutting edge 62d.

Further, the peripheral side surface of the cutting insert 55 extending from the top cutting rake surface 60 to the bottom cutting rake surface 70 comprises a pair of opposing identical (or substantially identical) convex minor side faces (only 82a visible); a pair of opposing identical (or substantially identical) cylindrical (or arcuate) side faces (only 82b visible); a pair of opposing identical (or substantially identical) planar major side faces (only 82c visible); and a pair of opposing identical (or substantially identical) truncated cylindrical side faces 81d and 82d. The cutting insert 55 has a pair of identical (or substantially identical) distinct peripheral support surfaces 86 and 87 on a top cutting rake face 60 wherein the faces 86 and 87 are co-planar and perpendicular to a major side face 82c. The double-sided tangential cutting insert 55 also has two identical (or substantially identical) axial support faces (only 85 visible) wherein the convex minor side face 82a is truncated at the middle by the face 85.

Figure 4:
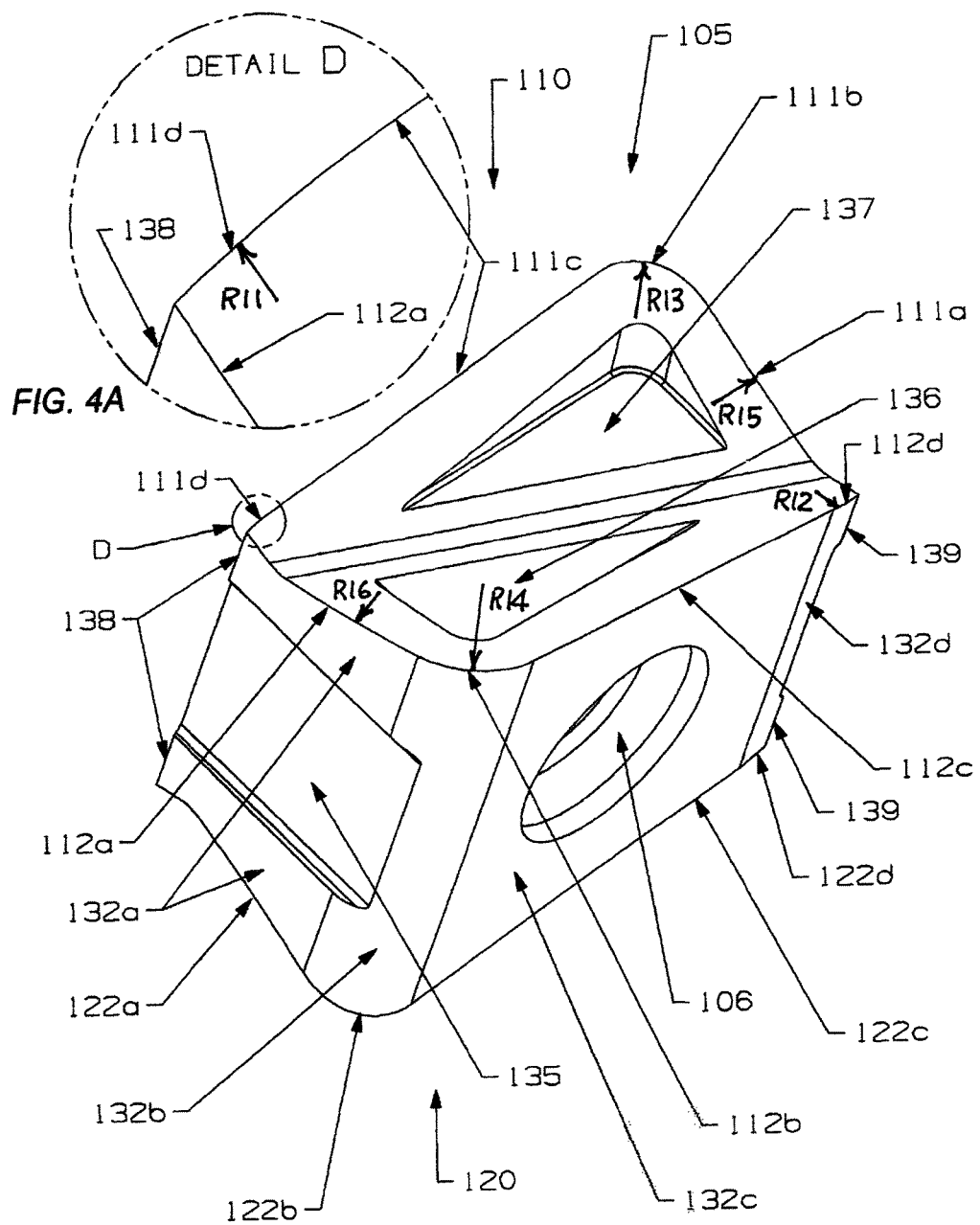
FIG. 4 is a three-dimensional perspective view of another specific embodiment of a trapezoidal double-sided tangential cutting insert with each indexable cutting edge comprising a convex minor cutting edge having a large radius, a single full nose cutting edge, a main cutting edge comprising a straight cutting edge portion and a convex cutting edge portion edge truncated by the adjacent convex minor side face according to present invention.

FIG. 4 is a perspective three-dimensional view of another specific embodiment of a trapezoidal double-sided tangential cutting insert 105 according to present invention disclosure. FIG. 4A is an enlarged view of the structure in the circle identified as D on FIG. 4.

The double-sided tangential cutting insert 105 with a through fastener hole 106 has a top cutting rake surface 110 and an identical (or substantially identical) bottom cutting rake surface 120. The cutting rake surface 110 has a peripheral cutting edge comprising mainly a pair of identical (or substantially identical) opposing main cutting edges each comprising a substantially straight cutting edge portion 111c (or 112c) and a convex cutting edge portion 111d (radius R11) (or 112d (radius R12)); a pair of opposing full nose cutting edges 111b (radius R13) and 112b (radius R14) having a radius ranging from about 0.4 mm to about 8.0 mm; and a pair of opposing convex minor cutting edges 111a (radius R15) and 112a (radius R16). For each of the convex minor cutting edges (111a, 112a), the radius R15 and R16 are at least about four times greater than the range of the corresponding full nose cutting edges 111b and 112b. In other words, R15 is at least about four times as great as R13, and R16 is at least about four times as great as R14.

A representative indexable cutting edge on the top cutting rake surface 110 comprises a convex minor cutting edge 111a having a large radius; a single full nose cutting edge 111b; a main cutting edge comprising a substantially straight main cutting edge portion 111c and a convex main cutting edge portion 111d which is truncated by the adjacent convex minor side face 132a. The convex main cutting edge portion 111d is tangent to the straight main cutting edge portion 111c at one end and truncated by the adjacent convex minor side face 132a at the other end. The function of the convex main cutting edge 111d is to eliminate the marks likely produced on the workpiece surface due to the deflection of a cutting tool system during the machining process.

A sharp edge 138 (similar for the sharp edge 139) is formed as a result that the convex cutting edge 111d is truncated by the adjacent convex minor side face 132a. A representative indexable cutting edge on the bottom cutting rake surface 120 comprises a convex minor cutting edge 122a having a large radius, a single full nose cutting edge 122b, a main cutting edge comprising a substantially straight main cutting edge portion 122c and a convex main cutting edge portion 122d. The convex main cutting edge portion 122d and the corresponding convex main side face 132d are truncated by the adjacent convex minor side face (invisible but the opposing face of 132a).

In reality of cutting insert manufacturing like in a carbide pressing process, the so-called sharp edges 138 and 139 may be blended with a small and fixed radius (typically about 0.25 mm or smaller) which is much smaller than a regular nose radius (ranging from about 0.4 to about 8 mm).

Further, the peripheral side surface of the cutting insert 105 extending from the top cutting rake surface 110 to the bottom cutting rake surface 120 comprises a pair of opposing identical (or substantially identical) convex minor side faces (only 132a visible); a pair of opposing identical (or substantially identical) cylindrical faces (only 132b visible); a pair of opposing identical (or substantially identical) planar major side faces (only 132c visible); and a pair of opposing identical (or substantially identical) truncated convex faces (only 132d visible). The cutting insert 105 has a pair of identical (or substantially identical) distinct peripheral support surfaces 136 and 137 on a top cutting rake face 110 wherein the faces 136 and 137 are co-planar and perpendicular to a major side face 132c. The double-sided tangential cutting insert 105 also has two identical (or substantially identical) axial support faces (only 135 visible) wherein the convex minor side face 132a is truncated by the face 135. The axial support face 135, the peripheral support surfaces 136 and 137, and the major side face 132c are perpendicular to each other.

Figure 5B:
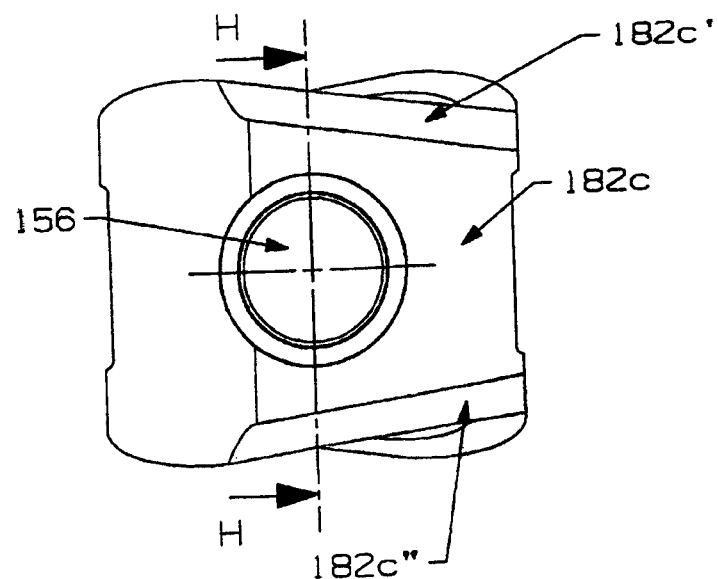
FIG. 5B is a projected view on the major side surface of the double-sided tangential cutting insert of FIG. 5A.
Figure 5C:
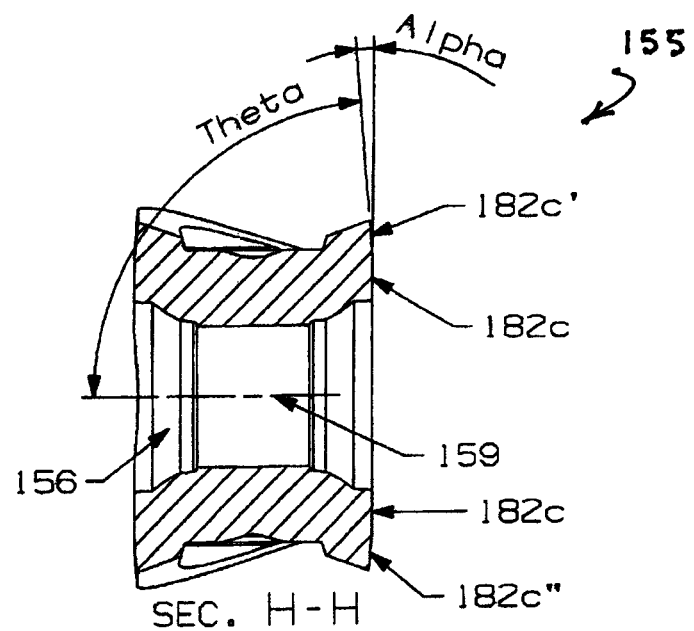
FIG. 5C is a sectional view of the double-sided tangential cutting insert of FIG. 5A.

FIGS. 5A through 5C illustrate an additional specific embodiment of a trapezoidal double-sided tangential cutting insert 155 with each indexable cutting edge being similar to that shown in FIG. 1, but having two major side surfaces trimmed at the two ends adjacent to each main cutting edges. FIG. 5A is a three-dimensional perspective view. FIG. 5B is a projected view on the major side surface. FIG. 5C a sectional view taken along section line H-H in FIG. 5B.

The double-sided tangential cutting insert 155 with a through fastener hole 156 and a center line 159 of the hole 156 has a top cutting rake surface 160 and an identical (or substantially identical) bottom cutting rake surface 170. Similar to that in FIG. 1, each indexable cutting edge on the top cutting rake surface 160 comprises a convex minor cutting edge 162a having a large radius so that it exhibits curvature, a single full nose cutting edge 162b, and a main cutting edge 162c truncated by the adjacent convex minor side face (not shown). Similarly, each indexable cutting edge on the bottom cutting rake surface 170 comprises a convex minor cutting edge 172a having a large radius, a single full nose cutting edge 172b, and a main cutting edge 172c truncated by the adjacent convex minor side face (not shown).

An additional feature added to the double-sided tangential cutting insert 155 is that each major side surface is trimmed at the two ends adjacent to the main cutting edges (162c and 172c). As shown in FIG. 5A, the major side surface 182c is trimmed forming a first secondary major side surface 182c' at the end close to the main cutting edge 162c and a second secondary major side surface 182c" at the end close to the main cutting edge 172c. These clearances help protect the integrity of the cutting edges. Referring to FIG. 5C, the trimming angle "Alpha" may have a negative value from the major side surface 182c if the angle "Theta" between the trimmed surface 182c' and the hole center line 159 is less than 90 degrees. Or the trimming angle "Alpha" may have a positive value from the major side surface 182c if the angle "Theta" between the trimmed surface 182c' and the hole center line 159 is larger than 90 degrees. The trimmed surface 182c" is identical (or substantially identical) to the trimmed surface 182c'.

Figure 6:
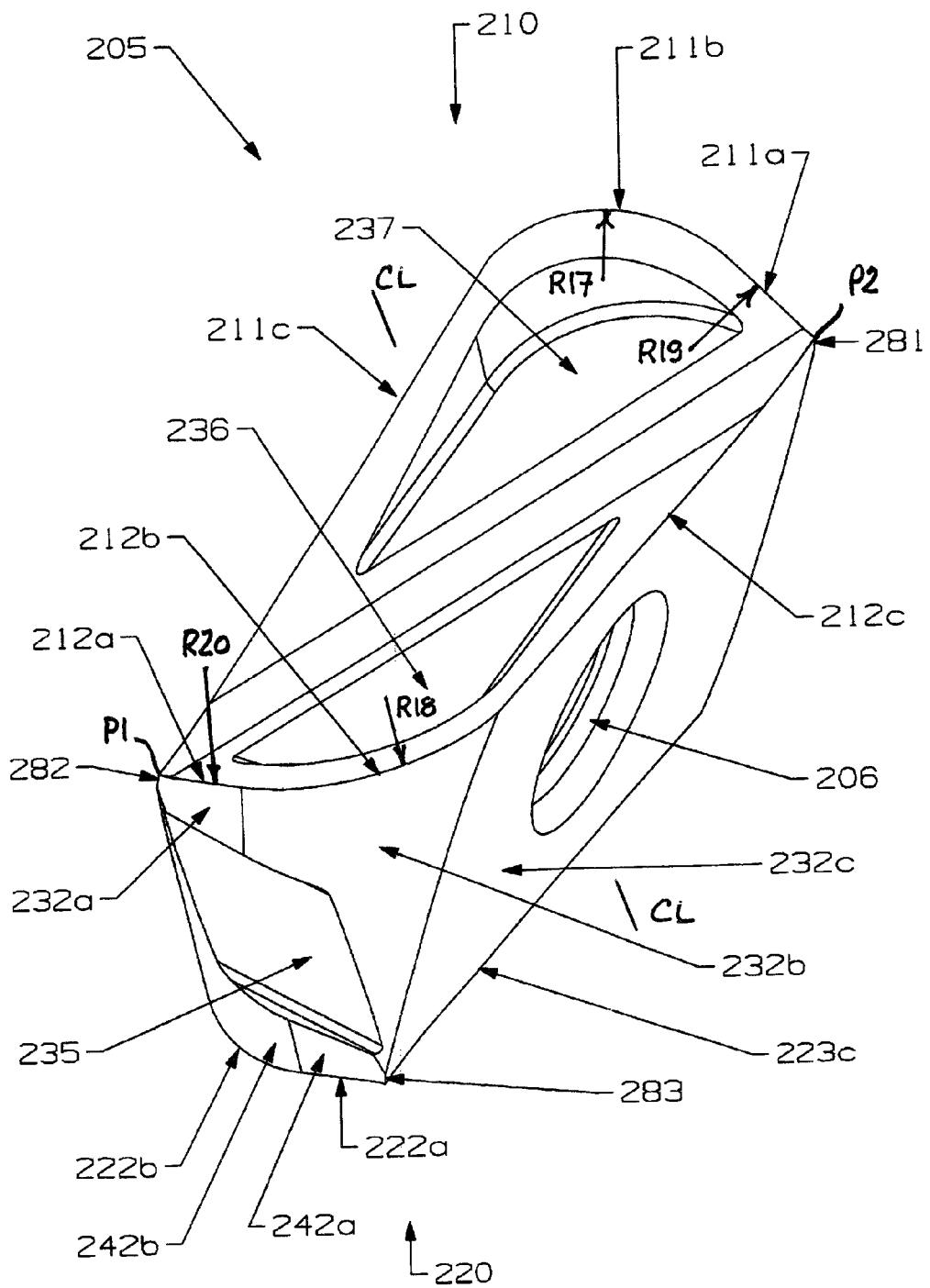
FIG. 6 is a three-dimensional perspective view of a specific embodiment of a parallelogram double-sided tangential cutting insert having parallelogram-shaped major side surfaces with each indexable cutting edge comprising a convex minor cutting edge having a large radius, a single full nose cutting edge, a main cutting edge truncated by the adjacent convex minor side face according to present invention.
Figure 7A:
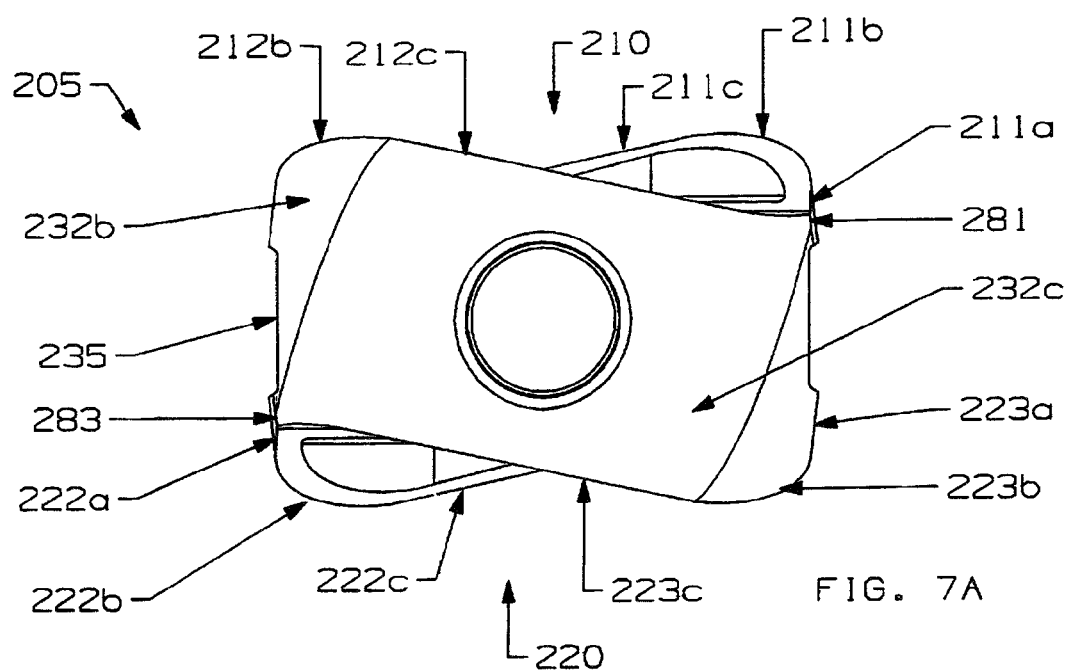
FIG. 7A is a projected view on the major side surface of the double-sided tangential cutting insert of FIG. 6.
Figure 7B:
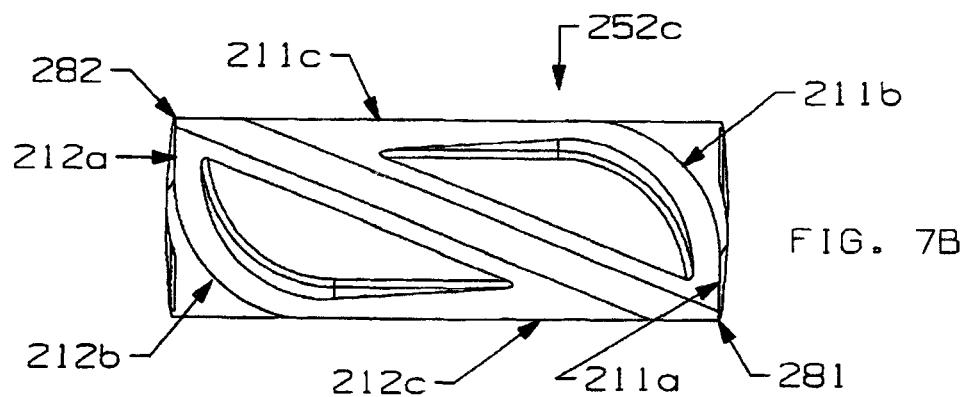
FIG. 7B is a projected view on the cutting rake surface of the double-sided tangential cutting insert of FIG. 6.
Figure 7C:
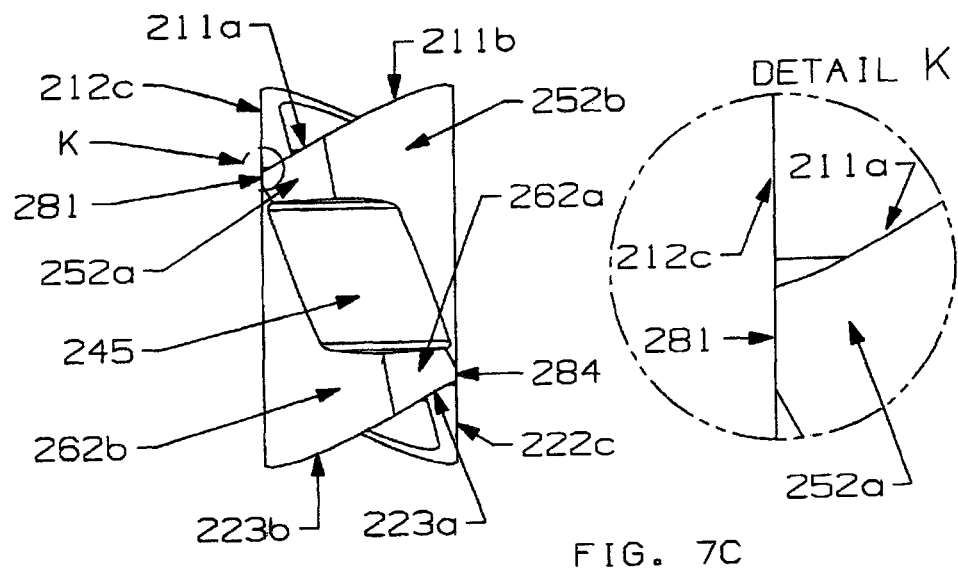
FIG. 7C is a projected view from the minor side surface on the right side together with a scaled detail view K of the double-sided tangential cutting insert of FIG. 6.

FIG. 6 and FIGS. 7A through 7C, illustrate a specific embodiment of a parallelogram double-sided tangential cutting insert 205. FIG. 6 is a three-dimensional perspective view. FIG. 7A is a projected view on the major side surface having a parallelogram shape. FIG. 7B is a projected view on the top cutting rake surface. FIG. 7C is a projected view on the minor side surface from the right side together with a scaled detail view K.

The double-sided tangential cutting insert 205 shown in FIG. 6 with a through fastener hole 206 has a top cutting rake surface 210 and an identical (or substantially identical) bottom cutting rake surface 220 (partially visible). The cutting rake surface 210 has a peripheral side shape comprising basically a pair of identical (or substantially identical) opposing substantially straight main cutting edges 211c and 212c, a pair of opposing full nose cutting edges 211b (radius R17) and 212b (radius R18) having a radius ranging from about 0.4 mm to about 8.0 mm, and a pair of opposing convex minor cutting edges 211a (radius R19 and 212a (radius R20). For each one of the convex minor cutting edges (221a, 212a), the radius R19 and R20 are about at least four times greater than the range of the corresponding full nose cutting edges 211b and 212b. In other words, R19 is at least about four times as great as R17, and R20 is at least about four times as great as R18. One of the two identical indexable cutting edges on the top cutting rake surface 210 comprises a convex minor cutting edge 211a having a large radius, a single full nose cutting edge 211b, a main cutting edge 211c truncated by the adjacent convex minor side face 232a. A full nose cutting edge is defined as the nose cutting edge being tangent to both adjacent cutting edges.

A sharp edge 282 and a point of truncation P1 at the top of the sharp edge 282 are formed as a result that the major cutting edge 211c is truncated by the adjacent convex minor side face 232a. Similarly, another indexable cutting edge on the top cutting rake surface 210 comprises a convex minor cutting edge 212a having a large radius (R20), a single full nose cutting edge 212b, a major cutting edge 212c truncated by the adjacent convex minor side face 252a (FIG. 7C). A sharp edge 281 and a point of truncation P1 at the top of the sharp edge 281 (or at the end of the main cutting edge 212c) are also formed as a result that the major cutting edge 212c is truncated by the adjacent convex minor side face 252a.

Referring to a median plane located between the top cutting rake surface 210 and the bottom cutting rake surface 220 and passing through the center line (CL in FIG. 6), the nose cutting edge 212b is farther away from the median plane than the point of truncation P1. Also, the nose cutting edge 211b is farther away from the median plane than the point of truncation P1.

In reality of cutting insert manufacturing like in a carbide pressing process, the so-called sharp edges 281 and 282 may actually be blended with a small radius (typically about 0.25 mm or smaller) which is much smaller than a regular nose radius (typically ranging from about 0.4 to about 8 mm).

Similar analysis or description may be carried out for the two indexable cutting edges (222a, 222b and 222c; and 223a, 223b and 223c) and the corresponding sharp edges 283 and 284 on the bottom cutting rake face 220 of the cutting insert 205 simply because the bottom cutting rake face 220 is identical to the top cutting rake face 210. The main cutting edge 212c on the top cutting rake face 210 is generally parallel to the cutting edge 223c on the bottom cutting rake face 220, thus referred as a parallelogram double-sided tangential cutting insert.

Further, the peripheral side surface of the cutting insert 205 extending from the cutting edges on the top cutting rake surface 210 towards the bottom cutting rake surface 220 comprises a pair of identical opposing planar major side faces 232c (FIG. 6 & FIG. 7A) and 252c (FIG. 7B) functioning as seating faces; a pair of opposing identical conical side faces 232b (FIG. 6 & FIG. 7A) and 252b (FIG. 7C); and a pair of opposing identical convex minor side faces 232a and 252a; while the peripheral side surface of the cutting insert 205 extending from the cutting edges on the bottom cutting rake surface 220 towards the top cutting rake surface 210 comprises a pair of same planar major side faces 232c and 252c; a pair of opposing identical conical side faces 242b and 262b; and a pair of opposing identical convex minor side faces 242a and 262a. Therefore, the planar major side faces 232c and 252c are extended all way from the top cutting rake surface 210 to the bottom cutting rake surface 220, however, each conical side 232b, 252b and each minor convex side face 232a, 252a on the top cutting rake face 210 are not extended to the bottom cutting rake face 220, and similarly each conical side face 242b, 262b and each convex minor side face 242a, 262a on the bottom cutting rake face 220 are not extended to the top cutting rake face 210.

The cutting insert 205 has a pair of identical, but distinct, peripheral support surfaces 236 and 237 on the top cutting rake face 210 wherein the faces 236 and 237 are co-planar, 180-degree symmetric about a center line (CL on FIG. 6) passing through the center of the cutting insert 205, and perpendicular to the faces 236 or 237. The double-sided tangential cutting insert 205 also has two identical axial support faces 235 and 245 wherein the convex minor side faces 232a, 242a, and the cylindrical faces 232b, 242b are truncated by the flat support face 235, and the convex minor side faces 252a, 262a, and the conical side faces 252b, 262b are truncated by the flat support face 245.

The double-sided tangential cutting insert 205 may have the similar geometrical features as those double-sided tangential cutting inserts described in FIGS. 3, 3A, 4, 5A, 5B and 5C. For example, in FIG. 3, a cutting insert with each indexable cutting edge comprising a convex minor cutting edge having a large radius, a single full nose cutting edge, a main cutting edge, and a smaller and fixed partial nose cutting edge truncated by the adjacent convex minor side face. As another example, in FIG. 4 a tangential cutting insert with each indexable cutting edge comprising a convex minor cutting edge having a large radius, a single full nose cutting edge, a main cutting edge comprising a straight main cutting edge portion and a convex main cutting edge portion truncated by the adjacent convex minor side face. As till another example, in FIGS. 5A, 5B, and 5C. a double-sided tangential cutting insert having two major side surfaces trimmed at the two ends adjacent to the main cutting edges.

Figure 8A:
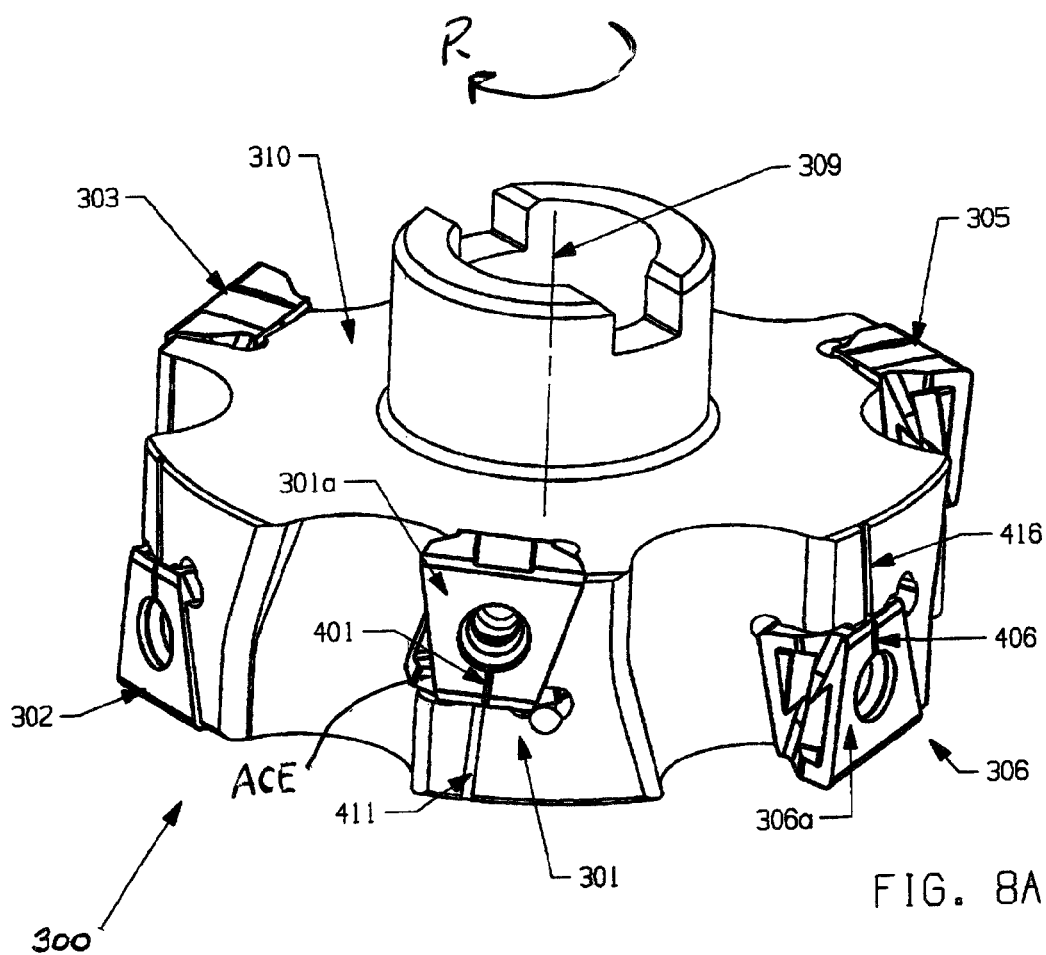
FIG. 8A shows a tangential cutting tool system comprising a tool holder that has at least an insert-receiving pocket and at least a trapezoidal double-sided tangential cutting insert according to present invention.
Figure 8B:
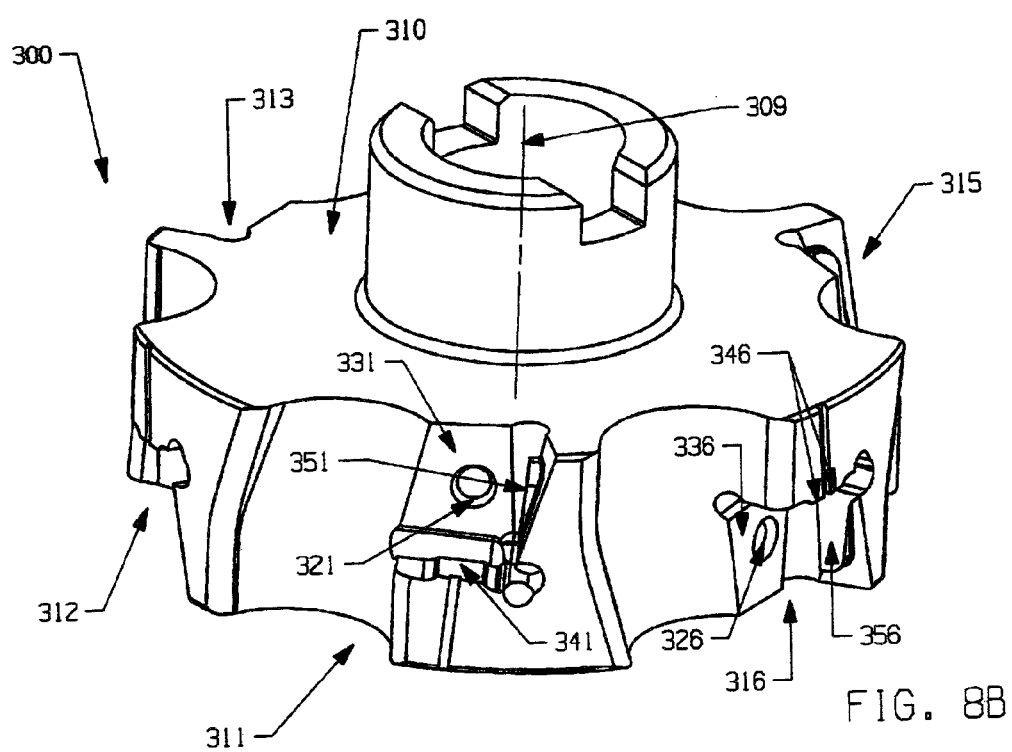
FIG. 8B shows a tangential cutting tool system comprising a tool holder that has at least an insert-receiving pocket.

FIGS. 8A and 8B show a tangential cutting tool system 300 comprising a tool holder 310; a plurality of insert-receiving pockets 311-316; and a plurality of trapezoidal double-sided tangential cutting insert 301-306 according to present invention. All the pockets 311-316 and all the tangential cutting inserts 301-306 are positional symmetric around the cutting axis 309 of the tool holder 310. The cutting insert is secured into a pocket 311 by a fastener (not shown) such as, for example, a threaded fastener like a screw, through a threaded hole 321 on the seating face 331. The direction of rotation of the tool holder 310 is designated by the arrow "R" in FIG. 8A. The active cutting edge of each double-sided tangential cutting insert is the radial outside cutting edge and is designated as ACE in FIG. 8A.

In an insert-receiving pocket 311 shown in FIG. 8B, the seating face 331; the axial pocket wall 341, and the peripheral pocket wall 351 are perpendicular to each other. Similarly, in an insert-receiving pocket 316 shown in FIG. 8B, the seating face 336; the axial pocket wall 346, and the peripheral pocket wall 356 are perpendicular to each other.

A major side surface from a double-sided tangential cutting insert, like the major side face 32c of cutting insert 5 in FIG. 1 or the major side face 82c of cutting insert 55 in FIG. 3 or the major side face 132c of cutting insert 105 in FIG. 4, or the major side face 182c of cutting insert 155 in FIGS. 5A-5C, will be abutted on the seating face 331 in the pocket 311 (or the seating face 336 in the pocket 316) in FIG. 8A (or FIG. 8B).

An axial support face from a double-sided tangential cutting insert, like the axial support face 35 of cutting insert 5 in FIG. 1 or the axial support face 85 of cutting insert 55 in FIG. 3 or the axial support face 135 of cutting insert 105 in FIG. 4 will be abutted against the axial pocket wall 341 in the pocket 311 (or the axial pocket wall 346 in the pocket 316) shown in FIG. 8.

A peripheral support face from a double-sided tangential cutting insert, like the peripheral support faces 36 and 37 of cutting insert 5 in FIG. 1 or the peripheral support faces 86 and 87 of cutting insert 55 in FIG. 3 or the peripheral support faces 136 and 137 of cutting insert 105 in FIG. 4 will be abutted against the peripheral pocket wall 351 in the pocket 311 (or the peripheral pocket wall 356 in the pocket 316) shown in FIG. 8.

Also, there is an alignment mark (or insert alignment indicator) 401 on the major side surface 301a of the cutting insert 301 (or an alignment mark 406 on the major side surface 306a of the cutting insert 306) which is aligned to a corresponding mark (or holder alignment indicator) 411 or a corresponding mark (or holder alignment indicator) 416 on the tool holder 310. This will prevent an operator from mistakenly positioning a double-sided tangential cutting insert 301-306 into a pocket 311-316, which would cause a damage to the cutting tool system.

Figure 9:
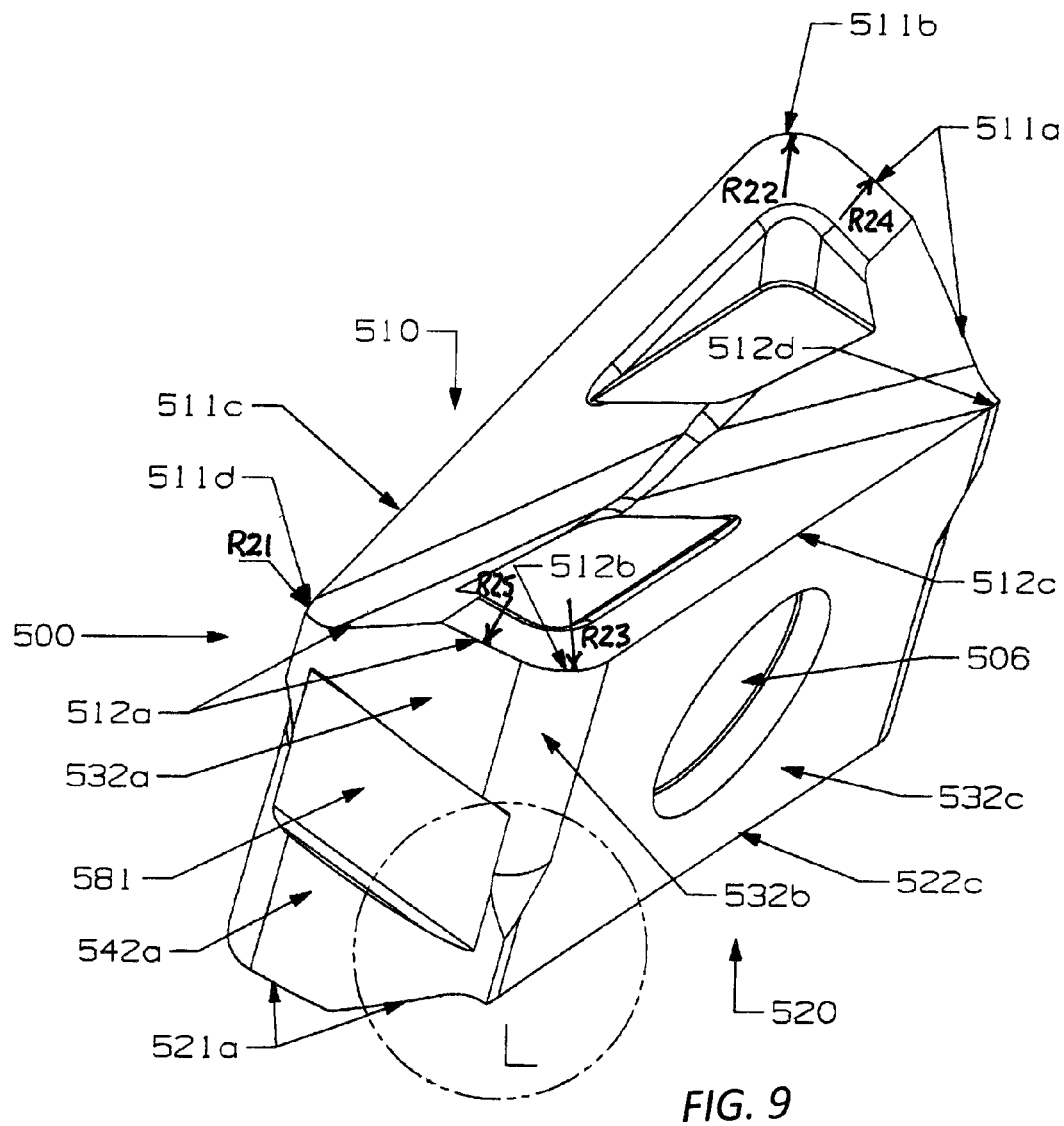
FIG. 9 is a three-dimensional perspective view that shows a specific embodiment of a parallelogram double-sided tangential cutting insert according to the present invention.

FIG. 9 shows a specific embodiment of a parallelogram double-sided tangential cutting insert 500 in a three-dimensional perspective view. The cutting insert 500 with a through fastener hole 506 has a top cutting rake surface 510 and an identical bottom cutting rake surface 520 (partially visible). A representative indexable cutting edge on the top cutting rake surface 510 comprises a convex minor cutting edge 511a having a large radius; a single full nose cutting edge 511b; a main cutting edge comprising a substantially straight main cutting edge portion 511c and a convex main cutting edge portion 511d. The convex main cutting edge portion 511d is tangent to the straight main cutting edge portion 511c at one end and truncated by the adjacent convex minor side face 532a at the other end. The function of the convex main cutting edge 511d is to eliminate the marks likely produced on the workpiece surface due to the deflection of a cutting tool system during the machining process. As seen from each indexable cutting edge in FIG. 9, for example, the single full nose cutting edge 511b is at a raised position while the convex main cutting edge portion 511d is at a lowered position with reference to the through hole 506. The convex main cutting edge portion 511d has a substantially large radius (as compared with a minor nose radius in a conventional tangential cutting insert), as a practical example shown in FIG. 9, R21=about 3 mm.

The identical full nose cutting edges 511b (radius R22) and 512b (radius R23) have a typical radius ranging from about 0.4 mm to about 8.0 mm, and the convex minor cutting edges 511a (radius R24) and 512a (radius R25) have a radius at least four (4) times more than the range of the corresponding full nose cutting edges 511b and 512b. In other words, R24 is at least about four times as great as R22, and R25 is at least about four times as great as R23. A full nose cutting edge is defined as that the nose cutting edge being tangent to both adjacent cutting edges. Thus, the full nose cutting edge 511b is tangent to both the straight main cutting edge portion 511c and the convex minor cutting edge 511a with a large radius, and similarly, the full nose cutting edge 512b is tangent to both the straight main cutting edge portion 512c and the convex minor cutting edge 512a with a large radius.

The double-sided tangential cutting insert 500 shown in FIG. 9 is usually referred as a parallelogram double-sided tangential cutting insert because the straight main cutting edge portion 512c at the top face 510 is parallel to the corresponding the straight main cutting edge portion 522c at the bottom face 520.

Figure 9A:
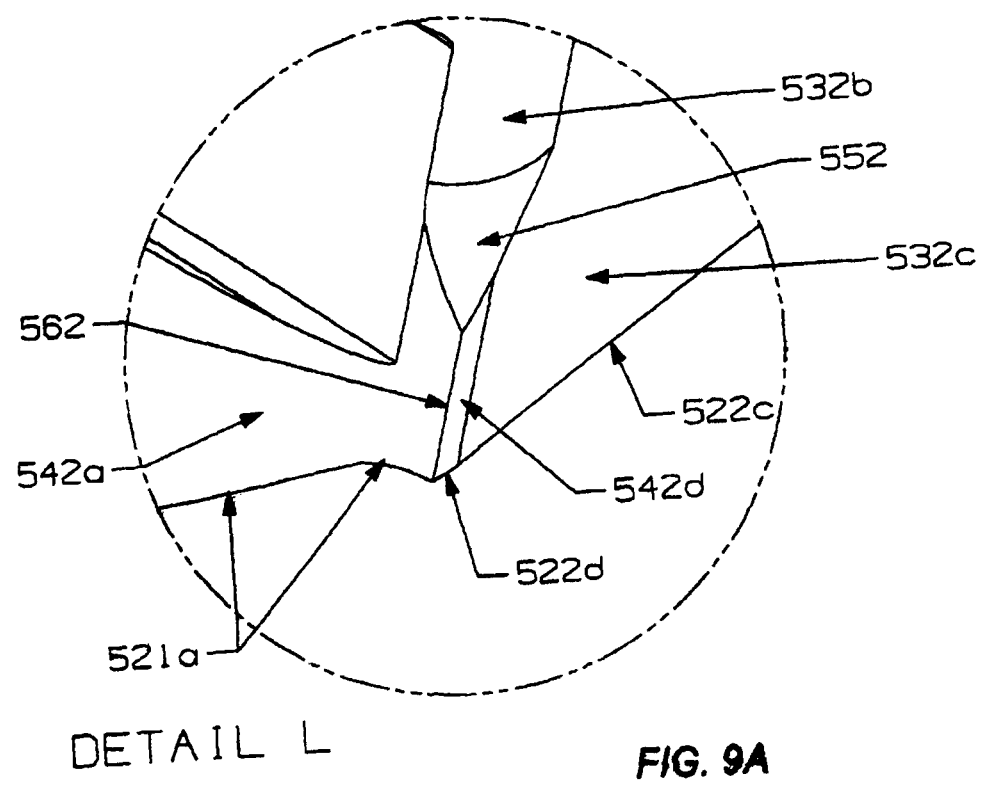
FIG. 9A is an enlarged view identified as DETAIL L that corresponds to the structure in the circle identified as L in FIG. 9.

As shown in the detailed view Detail L (FIG. 9A), a bridging face 552 is constructed between the nose cylindrical (or conical) side face 532b and a sharp edge 562 formed by the intersection between the convex minor side face 542a and the convex major side face 542d extended from the convex main cutting edge portion 522d. Same as that of the convex main cutting edge portion 511d as above-described, the function of the convex main cutting edge portion 522d is to eliminate the marks likely produced on the workpiece surface due to the deflection of a cutting tool system during machining.

The convex major side face 542d is also truncated by the adjacent convex minor side face 542a. A sharp edge 562 is formed as a result that the convex major side face 542d is truncated by the adjacent convex minor side face 542a. In reality of cutting insert manufacturing for producing a fully-pressed carbide product, the sharp edge 562 may be blended with a small radius (typically about 0.25 mm or smaller) which is much smaller than a regular nose radius (ranging from about 0.4 to about 8 mm).

Figure 9B:
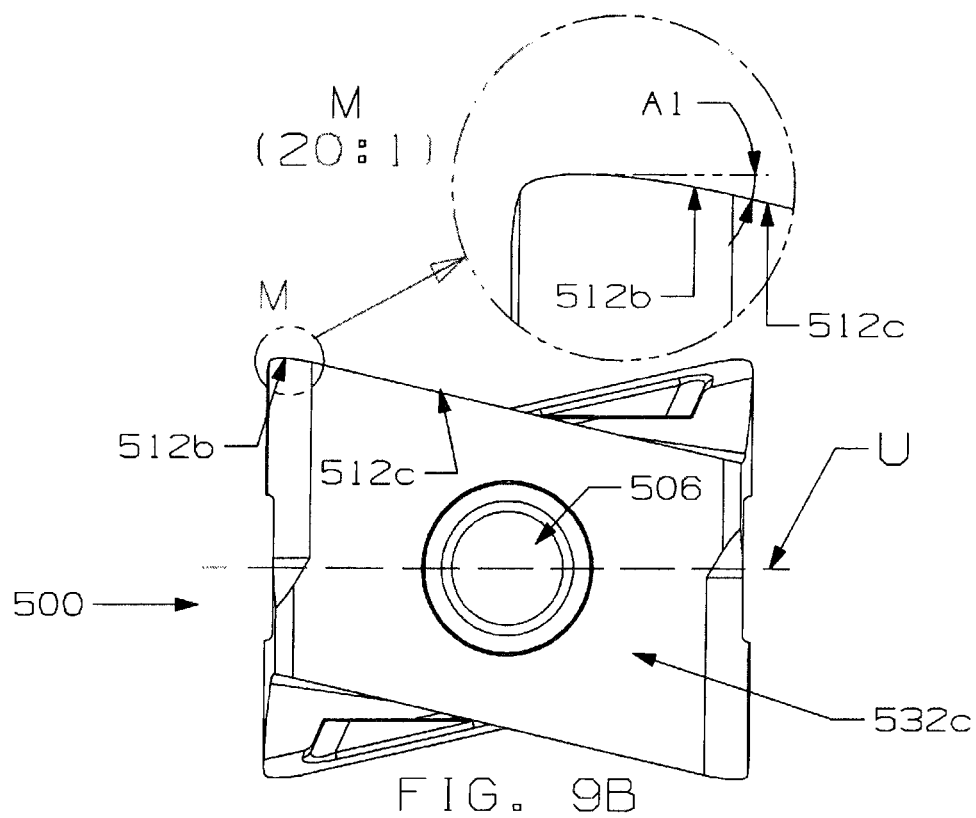
FIG. 9B is a projected view on the major side surface of the double-sided tangential cutting insert of FIG. 9 including enlarged view of the structure encompassed in a circle identified as "M"

Further, FIG. 9B demonstrates, as a representative embodiment, that the portion of the nose corner cutting edge 512b (of the cutting insert 500) at its end adjacent to a straight main cutting edge portion 512c, as viewed from a side of a major side surface 532c, forms an angle A1 (see Detail View M) with regard to a plane U passing through the center of the hole 506 and perpendicular to the major side surface 532c, wherein the angle A1 is larger than zero degrees, as shown in Detail View M. Note that the reference line used to define (in part) angle A1 is parallel to the plane U. Or in other words, the nose corner cutting edge 512b is substantially in alignment with the straight main cutting edge portion 512c, as viewed from a side (the adjacent one) of a major side surface 532c.

Figure 9C:
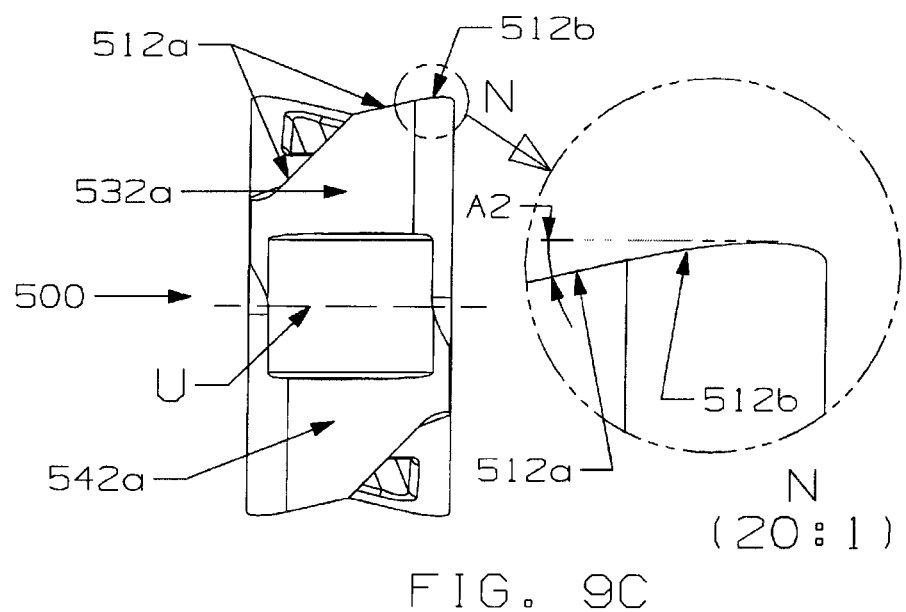
FIG. 9C is a projected view on the minor side surface of the double-sided tangential cutting insert of FIG. 9 including an enlarged view of the structure encompassed in a circle identified as "N"

And also FIG. 9C demonstrates, as a representative embodiment, that the portion of the nose corner cutting edge 512b at its end adjacent to a minor cutting edge 512a, as viewed from a side of a minor side surface 532a (or 542a), forms an angle A2 (see Detail View N) with regard to the plane U wherein the angle A2 is larger than zero degree as shown in Detail View N. Note that the reference line used to define (in part) angle A2 is parallel to the plane U. Or in other words, the nose corner cutting edge 512b is substantially in alignment with, or tangent to, an adjacent portion of the convex minor cutting edge 512a, as viewed from a side (the adjacent one) of a minor side surface 532a (or 542a).

Figure 10:
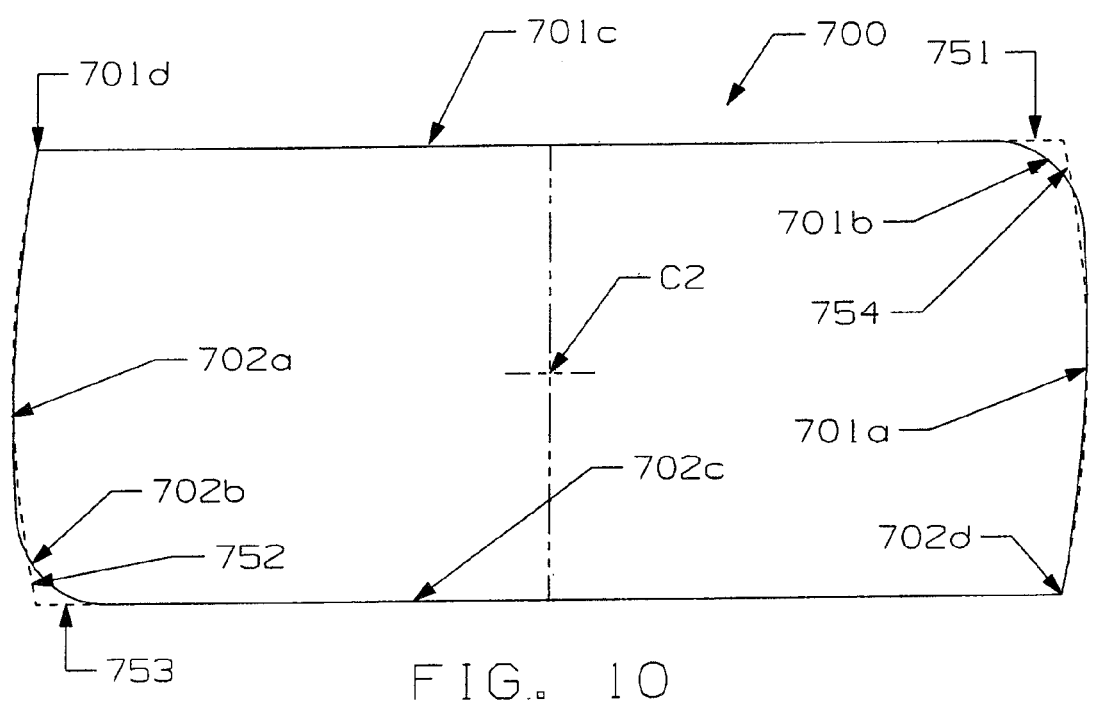
FIG. 10 is a view of a representative double-sided tangential cutting insert taken from the rake cutting face.

Referring to FIG. 10, the peripheral profiles as viewed from the chip rake faces of selected double-sided tangential cutting inserts, such as, for example, from the top cutting rake face 10 in FIG. 1B, from the top cutting rake face 60 in FIG. 3, from the top cutting rake face 110 in FIG. 4, and from the top cutting rake face 510 in FIG. 9, can be mathematically described as a sectioned barrel shape (two-dimensional) from a solid barrel shape (three-dimensional). FIG. 10 illustrates a generally barrel profile tangential cutting insert 700 (only periphery shown) as viewed from the chip rake face according to the present invention. A full cutting edge of the cutting insert 700 comprises a minor cutting edge 701a, a major nose corner 701b, a main cutting edge 701c (which can also comprise a straight main cutting edge portion and a convex main cutting edge portion like those shown and described in connection with the embodiment of FIG. 4 and the embodiment of FIG. 9) and a sharp point 701d (i.e. lack of a nosed corner). The cutting insert 700 is indexable by rotating 180 degrees around the center point C2 to have another full cutting edge comprising a minor cutting edge 702a, a major nose corner 702b, a main cutting edge 701c and a shape point 702d (i.e. lack of a nosed corner). The dotted straight lines 751 and 753, together with the dotted barreled (convex) curves 752 and 754, form a barrel like shape.

Figure 11A:
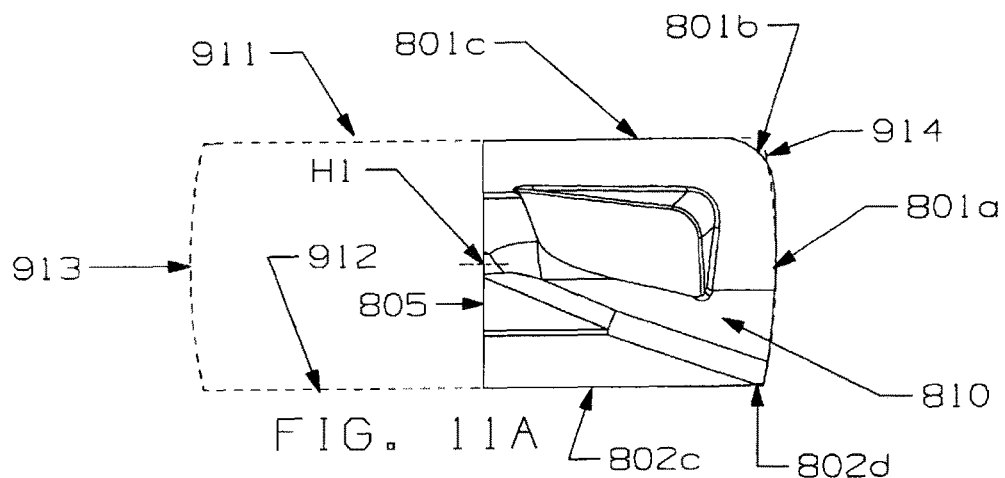
FIG. 11A is a side view taken from a cutting rake face and represents the right half portion of a complete double-sided tangential cutting insert.
Figure 11B:
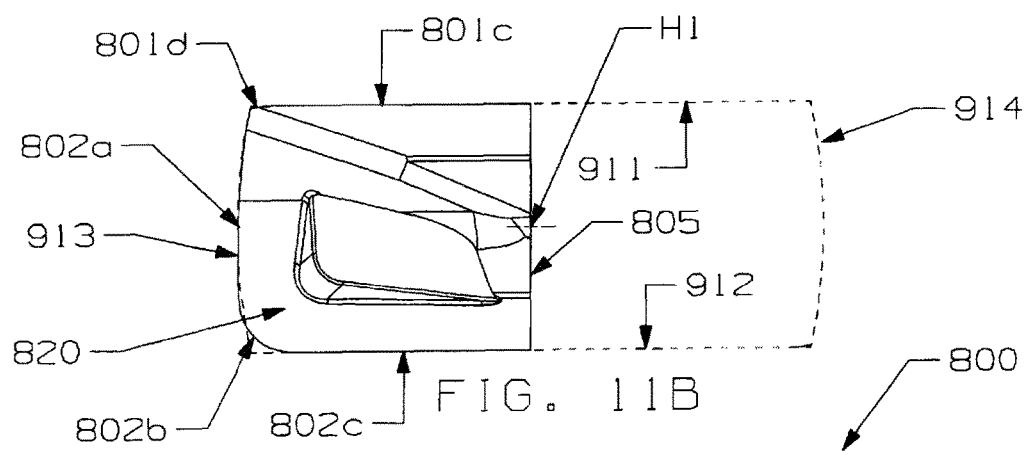
FIG. 11B is a side view taken from a cutting rake face and represents the left half portion of a complete double-sided tangential cutting insert.
Figure 11C:
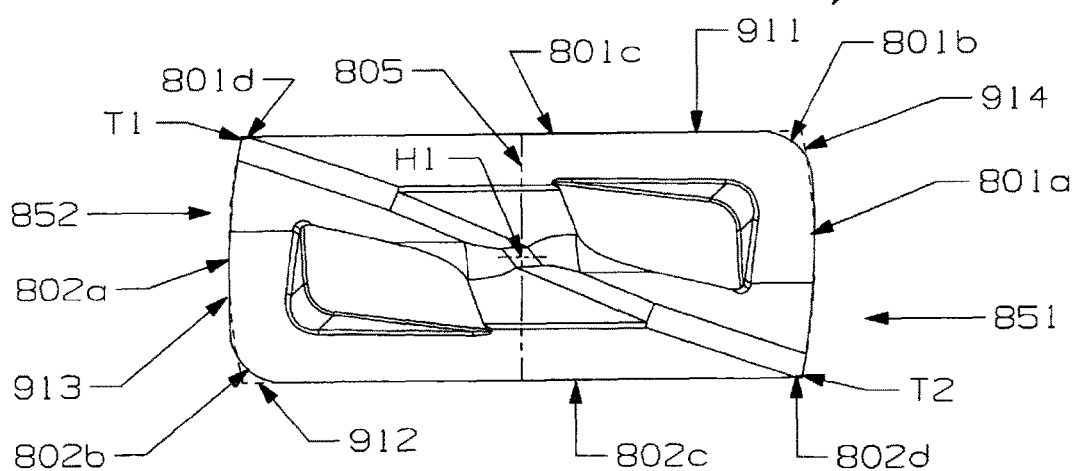
FIG. 11C is a side view taken from a cutting rake face of the right hand portion of FIG. 11A and the left hand portion of FIG. 11B to show the complete cutting rake face of the double-sided tangential cutting insert.

Referring to FIGS. 11A, 11B and 11C, these drawings illustrate the structure of the cutting insert at the various stages of a step-by-step design procedure (or process or method) to create a solid model of an inventive barrel shaped double-sided tangential cutting insert according to this invention disclosure. FIG. 11A is a side view from a cutting rake face (just like the cutting rake face 510 in FIG. 9) representing a right half portion 810 (as viewed in FIG. 11A) of a complete double-sided tangential cutting insert 800 (see FIG. 11C). As a first step in the procedure, there is the boundary of the right half portion 810 which includes a convex minor cutting edge 801a having a large radius, a full nose radius corner cutting edge 801b and a part of the first straight main cutting edge portion 801c, a vertical center line 805 (at half), a part of the second straight main cutting edge portion 802c and an adjoining convex main cutting edge portion 802d. The right half portion 810 is constructed in a generally barrel shape as demonstrated by a comparison to a standard barrel section (two dimensional) consisting of, which are shown by the broken lines, the top straight line 911, the left curve 913, the bottom straight line 912 and the right curve 914. One major difference between the right half portion 810 of the cutting insert 800 and the standard barrel profile in broken lines is the rounded nose corner 801b due to the essential requirement in reality machining operations.

FIG. 11B is a side view from a cutting rake face resulting from rotating the right half portion 810 about the center point H1 for 180 degrees to create the left half portion 820 (as viewed in FIG. 11B) of a complete double-sided tangential cutting insert 800 (see FIG. 11C). As the second step in the procedure, there is the boundary of the left half portion 820 which includes a convex minor cutting edge 802a having a large radius, a full nose radius corner cutting edge 802b and a part of the second straight main cutting edge portion 802c, a vertical center line 805 (at half), a part of the first straight main cutting edge portion 801c and an adjoining convex main cutting edge portion 801d. In other words, the left half portion 820 is 180 degree rotational symmetric to the right half portion 810 about the center point H1. Along the lines of the description in conjunction with FIG. 11A, FIG. 11B shows a standard barrel section (two dimensional) consisting of (shown by broken lines) the top straight line 911, the left curve 913, the bottom straight line 912 and the right curve 914.

Referring to FIG. 11C, FIG. 11C is a side view from a cutting rake face that shows the last step in the procedure which is the uniting of the right half portion 810 with the left half portion 820 to create a complete double-sided tangential cutting insert 800 which has a general barrel profile as viewed normally from a cutting rake face. More specifically, FIG. 11C shows the uniting that forms the first complete cutting edge of a double-sided tangential cutting insert 800 comprises a convex minor cutting edge 801a having a large radius, a single full nose radius corner cutting edge 801b, a straight main cutting edge portion 801c, and a convex main cutting edge portion 801d truncated by a convex minor side face 852 thus correspondently creating a shape point of truncation T1. Similarly, FIG. 11C shows the formation of the second complete cutting edge of a double-sided tangential cutting insert 800 that comprises a convex minor cutting edge 802a having a large radius, a single full nose radius corner cutting edge 802b, a straight main cutting edge portion 802c, and a convex main cutting edge portion 802d truncated by a convex minor side face 851 thus correspondently creating a shape point of truncation T2. Along the lines of the description in conjunction with FIG. 11A and FIG. 11B, FIG. 11C shows a standard barrel section (two dimensional) consisting of (shown by broken lines) the top straight line 911, the left curve 913, the bottom straight line 912 and the right curve 914.

Therefore we define that a double-sided tangential cutting insert according to present invention is a generally barrel profile (or shape) as viewed from a cutting rake face. We also define that the right half portion and the left portion are 180 degree rotational symmetric about the center point of the subject cutting insert, as viewed from a cutting rake face. The generally barrel shape as viewed from a cutting rake face is applied to both a double-sided tangential cutting insert having a parallelogram shape as viewed from a major side surface, and a double-sided tangential cutting insert having a trapezoidal shape as viewed from a major side surface.

The advantage of having a generally barrel profile as viewed from a cutting rake face is the barrel shaped minor cutting edge (or the convex minor cutting edge with a large radius) can easily adapt to the various undesired machining conditions such as, for example, tool holder deflections during machining and tolerance variations from product manufacturing while still effectively produce good surface finish on the machined workpiece surface.

Certain non-limiting embodiments according to the present disclosure include a double-sided tangential cutting insert having a peripheral shape, as viewed from the cutting rake face (or called end surface), comprising a pair of identical opposing main cutting edges, a pair of opposing full nose cutting edges having a radius ranging from about 0.4 mm to about 8.0 mm, and a pair of opposing convex minor cutting edges having a radius at least about four (4) times more than the range of the full nose cutting edges (defined as the nose cutting edge tangent to both adjacent cutting edges), wherein the main cutting edge is truncated by an adjacent convex minor side face; and wherein the main cutting edge may be in a form of a substantially straight cutting edge truncated by an adjacent convex minor side face; or in a combined form of a portion of a substantially straight cutting edge and a portion of a convex cutting edge truncated by an adjacent convex minor side face; or in a form of a portion of a substantially straight cutting edge and a portion of a partial nose edge having a small and fixed radius truncated by an adjacent convex minor side face.

Each of the patents and other documents identified herein are hereby incorporated in their entirety by reference herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A double-sided tangential cutting insert comprising:
a pair of substantially identical opposing cutting rake faces; a pair of substantially identical opposing major side surfaces; a pair of substantially identical opposing arcuate side faces; and a pair of substantially identical opposing generally convex minor side faces;
wherein one of the cutting rake surfaces comprises:
a pair of substantially identical opposing main cutting edges wherein each of the main cutting edge comprises a substantially straight main cutting edge portion and an adjoining convex main cutting edge portion wherein the convex main cutting edge portion terminates into an adjacent one of the convex minor side faces;
a pair of opposing full nose cutting edges having a nose cutting radius; and
a pair of opposing convex minor cutting edges having a minor cutting edge radius wherein the minor cutting edge radius is at least four times greater than the nose cutting radius; and
wherein the double-sided tangential cutting insert comprises four indexable cutting edges wherein each one of the indexable cutting edges comprising one of the convex minor cutting edges, one of the full nose cutting edges adjoining the one convex minor cutting edge, and one of the main cutting edges adjoining the one nose cutting edge.

2. The double-sided tangential cutting insert of claim 1, wherein each one of the cutting rake faces further contains a pair of substantially identical peripheral support surfaces wherein each one of the substantially identical peripheral support surfaces being generally co-planar and generally perpendicular to a major side face.

3. The double-sided tangential cutting insert of claim 1 wherein each major side surface has a trapezoidal shape.

4. The double-sided tangential cutting insert of claim 1 wherein each major side surface has a parallelogram shape.

5. The double-sided tangential cutting insert of claim 1 wherein each peripheral side shape as viewed from a cutting rake face has a generally barrel profile.

6. The double-sided tangential cutting insert of claim 1 wherein one of the nose cutting edges is in substantial alignment with the adjacent straight main cutting edge portion as viewed from the adjacent one of the major side surfaces, and the one nose cutting edge is in substantial alignment with the adjacent convex minor cutting edge as viewed from the adjacent one of the minor side faces.

7. A tangential cutting tool system, comprising:
a cutting tool holder comprising multiple insert-receiving pockets wherein each pocket comprises a seating face, an axial pocket wall, and a peripheral pocket wall wherein the seating face, the axial pocket wall and the peripheral pocket wall are perpendicular to each other; and a plurality of double-sided tangential cutting inserts being secured into said insert-receiving pockets wherein each double-sided tangential cutting insert comprising:
a pair of substantially identical opposing cutting rake faces; a pair of substantially identical opposing major side surfaces; a pair of substantially identical opposing arcuate side faces; and a pair of substantially identical opposing generally convex minor side faces;
wherein one of the cutting rake surfaces comprises:
a pair of substantially identical opposing main cutting edges wherein each of the main cutting edge comprises a substantially straight main cutting edge portion and an adjoining convex main cutting edge portion wherein the convex main cutting edge portion terminates into an adjacent one of the convex minor side faces;
a pair of opposing full nose cutting edges having a nose cutting radius; and
a pair of opposing convex minor cutting edges having a minor cutting edge radius wherein the minor cutting edge radius is at least four times greater than the nose cutting radius; and
wherein the double-sided tangential cutting insert further comprises four indexable cutting edges wherein each one of the indexable cutting edges comprising one of the convex minor cutting edges, the nose cutting edge adjoining the one convex minor cutting edge, and the main cutting edge adjoining the one nose cutting edge.

8. The tangential cutting tool system of claim 7, wherein the cutting rake face of the double-sided tangential cutting insert comprises a pair of identical peripheral support surfaces being generally co-planar and generally perpendicular to a major side face.

9. The tangential cutting tool system of claim 7 wherein each major side surface of the double-sided tangential cutting insert has a trapezoidal shape.

10. The tangential cutting tool system of claim 7 wherein each major side surface of the double-sided tangential cutting insert has a parallelogram shape.

11. The tangential cutting tool system of claim 7 wherein the tool holder containing a holder alignment indicator and the major side surface of the double-sided tangential cutting insert containing an insert alignment indicator wherein when the double-sided tangential cutting insert is correctly secured to the tool holder the holder alignment indicator being in alignment with the insert alignment indicator.

12. A double-sided tangential cutting insert comprising:
a top cutting rake face and an oppositely disposed bottom cutting rake face wherein the top cutting rake face being substantially identical to the bottom cutting rake face;
a pair of substantially identical major side surfaces wherein a pair of substantially identical opposing main cutting edges being at the junctures of the top cutting rake face and the bottom cutting rake face and the pair of major side surfaces;

a pair of opposing substantially identical generally arcuate side faces wherein a pair of opposing nose cutting edges being at the juncture of the top cutting rake face and the bottom cutting rake face and the pair of generally arcuate side faces, and wherein each nose cutting edge having a nose cutting radius;

a pair of opposing substantially identical convex minor side surfaces wherein a pair of opposing convex minor cutting edges being at the junctures of the top cutting rake face and the bottom cutting rake face and the pair of convex minor side faces and wherein each of the convex minor cutting edges having a minor cutting edge radius, and the minor cutting edge radius being at least about four times greater than the nose cutting radius;

each one of the main cutting edges comprising a substantially straight main cutting edge portion and an adjoining convex main cutting edge portion wherein the convex main cutting edge portion terminates into an adjacent one of the convex minor side faces so as to define a generally sharp edge and a point of truncation; and the double-sided tangential cutting insert comprises four indexable cutting edges wherein each one of the indexable cutting edges comprising one of the convex minor cutting edges, the nose cutting edge adjoining the one convex minor cutting edge, and the main cutting edge adjoining the one nose cutting edge.

13. The double-sided tangential cutting insert of claim 12 wherein a median plane being between the top cutting rake face and the bottom cutting rake face, and the nose cutting edges being farther away from the median plane than the point of truncation.

14. The double-sided tangential cutting insert of claim 12 further comprising a pair of oppositely disposed axial support faces wherein each axial support face being contained in the generally arcuate side face and the adjacent generally convex minor side face and opening at the generally sharp edge.

15. The double-sided tangential cutting insert of claim 12 further comprising a pair of oppositely disposed axial support faces wherein each axial support face being completely contained in the generally arcuate side face and the adjacent generally convex minor side face.

16. The double-sided tangential cutting insert of claim 12 wherein an attachment aperture passes between the pair of substantially identical major side surfaces.

17. The double-sided tangential cutting insert of claim 12 wherein each one of the top cutting rake face and bottom cutting rake face further contains a pair of substantially identical distinct peripheral support surfaces wherein each one of the distinct peripheral support surfaces being generally co-planar and generally perpendicular to a major side face.

18. The double-sided tangential cutting insert of claim 12 wherein each one of the major side surfaces comprising a central major side surface, an upper secondary major side surface adjacent to the top rake cutting face wherein one of the main cutting edges being at the juncture of the upper secondary major side surface and the top rake cutting face, and a lower secondary major side surface adjacent to the bottom rake cutting face wherein another of the main cutting edges being at the juncture of the lower secondary major side surface and the bottom rake cutting face.

19. The double-sided tangential cutting insert of claim 12 further including a pair of truncated cylindrical side faces wherein a pair of partial nose cutting edges are at the juncture of the top rake cutting face and the bottom cutting rake face with the pair of truncated cylindrical surfaces, and each one of the particle nose cutting edges being adjacent to a corresponding one of the convex minor cutting edges.

20. The double-sided tangential cutting insert of claim 19 wherein each of the partial nose cutting edges having a partial nose cutting radius less than the minor cutting edge radius, and the partial nose cutting radius being less than the nose cutting radius.

21. The double-sided tangential cutting insert of claim 12 wherein the generally arcuate side face corresponding to one of the nose cutting edges at the juncture with the top rake cutting face extending toward the bottom rake cutting face, and a convex major side face intersecting the bottom rake cutting face to form the convex main cutting edge portion extending toward the top rake cutting face, and a bridging face joining the convex major side face and the generally sharp edge.

\* \* \* \* \*